(12) United States Patent
Weaver

(10) Patent No.: US 8,704,960 B2
(45) Date of Patent: Apr. 22, 2014

(54) DEPLOYMENT SYSTEM AND METHOD FOR USER INTERFACE DEVICES

(75) Inventor: Todd Weaver, Winter Park, FL (US)

(73) Assignee: Panasonic Avionics Corporation, Lake Forest, CA (US)

( * ) Notice: Subject to any disclaimer, the term of this patent is extended or adjusted under 35 U.S.C. 154(b) by 344 days.

(21) Appl. No.: 13/094,315

(22) Filed: Apr. 26, 2011

(65) Prior Publication Data

US 2011/0261273 A1   Oct. 27, 2011

Related U.S. Application Data

(60) Provisional application No. 61/343,368, filed on Apr. 27, 2010.

(51) Int. Cl.
*H04N 5/64* (2006.01)

(52) U.S. Cl.
USPC ...... 348/837; 348/836; 345/905; 361/679.27; 192/52.1; 192/52.4; 192/52.5; 192/107 C; 192/107 R; 248/274.1; 248/284.1; 248/454; 248/455; 297/188.15; 297/188.16; 297/188.21

(58) Field of Classification Search
USPC .......... 348/837, 825, 836, 838, 839; 345/905; 248/284.1, 274.1, 276.1, 285.1, 286.1, 248/287.1, 919, 917, 454, 455; 192/107 R, 192/107 C, 116.5, 52.1, 52.4, 52.5, 52.6; 361/679.26, 679.27, 679.28, 679.29; 297/188.21, 188.15, 188.16, 188.14, 297/188.17, 188.19, 188.2, 188.18
See application file for complete search history.

(56) References Cited

U.S. PATENT DOCUMENTS

| | | | |
|---|---|---|---|
| 3,037,812 A | 6/1962 | Monroe | |
| 3,653,228 A | 4/1972 | Tiberio | |
| 3,795,771 A | 3/1974 | Gundersen et al. | |
| 3,980,954 A | 9/1976 | Whyte | |

(Continued)

FOREIGN PATENT DOCUMENTS

| | | |
|---|---|---|
| CN | 1104160 A | 6/1995 |
| CN | 20052010326.4 | 12/2006 |

(Continued)

OTHER PUBLICATIONS

Collerais. WO2009/021933 EPO Full Text Translation. Feb. 2009.*

(Continued)

*Primary Examiner* — Christopher S Kelley
*Assistant Examiner* — Zhihan Zhou
(74) *Attorney, Agent, or Firm* — Orrick, Herrington & Sutcliffe LLP

(57) ABSTRACT

A deployment system for user interface devices with enhanced interface capabilities and methods for manufacturing and using same. The deployment system includes a main rotating joint system and a device mounting assembly that are coupled via an extension support system. The main rotating joint system enables the deployment system to be installed at any suitable installation location, such as an armrest; whereas, the device mounting assembly is configured to receive a selected user interface device. Advantageously, the deployment system provides an enlarged internal channel for accommodating larger communication cables and a progressive clutch system for supporting the increased weight of the user interface devices. The deployment system thereby can maintain near-constant tension during deployment of the user interface devices, inhibiting drop injuries to users and damage to the user interface devices.

19 Claims, 16 Drawing Sheets

(56) References Cited

U.S. PATENT DOCUMENTS

| | | | |
|---|---|---|---|
| 4,163,387 A | 8/1979 | Schroeder | |
| 4,208,740 A | 6/1980 | Yin et al. | |
| 4,367,488 A | 1/1983 | Leventer et al. | |
| 4,428,078 A | 1/1984 | Kuo | |
| 4,571,456 A * | 2/1986 | Paulsen et al. | 379/457 |
| 4,583,131 A | 4/1986 | Dakin | |
| 4,584,603 A | 4/1986 | Harrison | |
| 4,647,980 A | 3/1987 | Steventon et al. | |
| 4,697,683 A * | 10/1987 | Graton et al. | 192/107 C |
| 4,742,544 A | 5/1988 | Kupnicki et al. | |
| 4,774,514 A | 9/1988 | Hildebrandt et al. | |
| 4,835,604 A | 5/1989 | Kondo et al. | |
| 4,866,515 A | 9/1989 | Tagawa et al. | |
| 4,866,704 A | 9/1989 | Bergman | |
| 4,866,732 A | 9/1989 | Carey et al. | |
| 4,887,152 A | 12/1989 | Matsuzalci et al. | |
| 4,890,104 A | 12/1989 | Takanabe et al. | |
| 4,896,209 A | 1/1990 | Matsuzaki et al. | |
| 4,897,714 A | 1/1990 | Ichise et al. | |
| 4,939,527 A | 7/1990 | Lamberty et al. | |
| 4,958,381 A | 9/1990 | Toyoshima | |
| 4,975,696 A | 12/1990 | Salter, Jr. et al. | |
| 5,001,642 A | 3/1991 | Botzenhardt et al. | |
| 5,005,183 A | 4/1991 | Carey et al. | |
| 5,009,384 A | 4/1991 | Gerke et al. | |
| 5,027,124 A | 6/1991 | Fitzsimmons et al. | |
| 5,034,808 A | 7/1991 | Murray | |
| 5,057,835 A | 10/1991 | Factor et al. | |
| 5,119,104 A | 6/1992 | Heller | |
| 5,123,015 A | 6/1992 | Brady, Jr. et al. | |
| 5,136,304 A | 8/1992 | Peters | |
| 5,142,550 A | 8/1992 | Tymes | |
| 5,144,290 A | 9/1992 | Honda et al. | |
| 5,151,896 A | 9/1992 | Bowman et al. | |
| 5,168,272 A | 12/1992 | Akashi et al. | |
| 5,177,616 A | 1/1993 | Riday | |
| 5,179,447 A * | 1/1993 | Lain | 348/837 |
| 5,189,671 A | 2/1993 | Cheng | |
| 5,195,183 A | 3/1993 | Miller et al. | |
| 5,208,590 A | 5/1993 | Pitts | |
| 5,237,659 A | 8/1993 | Takats | |
| 5,243,652 A | 9/1993 | Teare et al. | |
| 5,247,414 A | 9/1993 | Mitchell et al. | |
| 5,276,455 A | 1/1994 | Fitzsimmons et al. | |
| 5,280,498 A | 1/1994 | Tymes et al. | |
| 5,283,868 A | 2/1994 | Baker et al. | |
| 5,289,272 A | 2/1994 | Rabowsky et al. | |
| 5,289,378 A | 2/1994 | Miller et al. | |
| 5,295,089 A | 3/1994 | Ambasz | |
| 5,301,185 A | 4/1994 | Cherry | |
| 5,305,308 A | 4/1994 | English et al. | |
| 5,305,321 A | 4/1994 | Crayford | |
| 5,311,302 A | 5/1994 | Berry et al. | |
| 5,311,515 A | 5/1994 | Henderson et al. | |
| 5,325,131 A | 6/1994 | Penney | |
| 5,343,456 A | 8/1994 | Maeda | |
| 5,383,178 A | 1/1995 | Unverrich | |
| 5,390,326 A | 2/1995 | Shah et al. | |
| 5,398,991 A * | 3/1995 | Smith et al. | 297/188.16 |
| 5,410,754 A | 4/1995 | Klotzbach et al. | |
| 5,424,951 A | 6/1995 | Nobe et al. | |
| 5,444,762 A | 8/1995 | Frey et al. | |
| 5,463,656 A | 10/1995 | Polivka et al. | |
| 5,469,363 A | 11/1995 | Saliga | |
| 5,481,478 A | 1/1996 | Palmieri et al. | |
| 5,493,702 A | 2/1996 | Crowley et al. | |
| 5,524,272 A | 6/1996 | Podowski et al. | |
| 5,543,805 A | 8/1996 | Thaniyavarn | |
| 5,555,466 A | 9/1996 | Scribner et al. | |
| 5,557,656 A | 9/1996 | Ray et al. | |
| 5,568,484 A | 10/1996 | Margis | |
| 5,596,647 A | 1/1997 | Wakai et al. | |
| 5,610,822 A | 3/1997 | Murphy | |
| 5,617,331 A | 4/1997 | Wakai et al. | |
| 5,640,002 A | 6/1997 | Rupert et al. | |
| 5,666,291 A | 9/1997 | Scott et al. | |
| 5,678,171 A | 10/1997 | Toyoma et al. | |
| 5,701,582 A | 12/1997 | DeBey | |
| 5,706,353 A | 1/1998 | Arai et al. | |
| 5,709,448 A | 1/1998 | Jennings et al. | |
| 5,711,014 A | 1/1998 | Crowley et al. | |
| 5,745,159 A | 4/1998 | Wax et al. | |
| 5,751,248 A | 5/1998 | Thaniyavarn | |
| 5,760,819 A | 6/1998 | Sklar et al. | |
| 5,790,175 A | 8/1998 | Sklar et al. | |
| 5,790,423 A | 8/1998 | Lau et al. | |
| 5,790,787 A | 8/1998 | Scott et al. | |
| 5,801,751 A | 9/1998 | Sklar et al. | |
| 5,808,660 A | 9/1998 | Sekine et al. | |
| 5,831,664 A | 11/1998 | Wharton et al. | |
| 5,832,380 A | 11/1998 | Ray et al. | |
| 5,835,127 A | 11/1998 | Booth et al. | |
| 5,854,591 A | 12/1998 | Atkinson | |
| 5,857,869 A | 1/1999 | Parcel et al. | |
| 5,878,345 A | 3/1999 | Ray et al. | |
| 5,884,166 A | 3/1999 | Ray et al. | |
| 5,889,268 A | 3/1999 | Swartz | |
| 5,889,775 A | 3/1999 | Sawicz et al. | |
| 5,929,895 A | 7/1999 | Berry et al. | |
| 5,950,129 A | 9/1999 | Schmid et al. | |
| 5,953,429 A | 9/1999 | Wakai et al. | |
| 5,959,596 A | 9/1999 | McCarten et al. | |
| 5,960,343 A | 9/1999 | Ray et al. | |
| 5,966,442 A | 10/1999 | Sachdev | |
| 5,973,722 A | 10/1999 | Wakai et al. | |
| 5,990,928 A | 11/1999 | Sklar et al. | |
| 6,003,008 A | 12/1999 | Postrel et al. | |
| 6,014,381 A | 1/2000 | Troxel et al. | |
| 6,020,848 A | 2/2000 | Wallace et al. | |
| 6,047,165 A | 4/2000 | Wright et al. | |
| 6,058,288 A | 5/2000 | Reed et al. | |
| 6,078,297 A | 6/2000 | Kormanyos | |
| 6,078,348 A | 6/2000 | Klosterman et al. | |
| 6,108,523 A | 8/2000 | Wright et al. | |
| 6,108,539 A | 8/2000 | Ray et al. | |
| 6,129,274 A | 10/2000 | Suzuki | |
| 6,130,727 A | 10/2000 | Toyozumi | |
| 6,135,549 A | 10/2000 | Demick et al. | |
| 6,151,497 A | 11/2000 | Yee et al. | |
| 6,154,186 A | 11/2000 | Smith et al. | |
| 6,160,998 A | 12/2000 | Wright et al. | |
| 6,163,681 A | 12/2000 | Wright et al. | |
| 6,167,238 A | 12/2000 | Wright | |
| 6,173,159 B1 | 1/2001 | Wright et al. | |
| 6,177,887 B1 | 1/2001 | Jerome | |
| 6,181,990 B1 | 1/2001 | Grabowsky et al. | |
| 6,201,797 B1 | 3/2001 | Leuca et al. | |
| 6,208,307 B1 | 3/2001 | Frisco et al. | |
| 6,216,065 B1 | 4/2001 | Hall et al. | |
| 6,249,913 B1 | 6/2001 | Galipeau et al. | |
| 6,266,664 B1 | 7/2001 | Russell-Falla et al. | |
| 6,278,936 B1 | 8/2001 | Jones | |
| 6,285,878 B1 | 9/2001 | Lai | |
| 6,286,139 B1 | 9/2001 | Decinque | |
| 6,338,045 B1 | 1/2002 | Pappas | |
| 6,345,720 B1 | 2/2002 | Redden et al. | |
| 6,390,920 B1 | 5/2002 | Infiesto et al. | |
| 6,392,692 B1 | 5/2002 | Monroe | |
| 6,484,011 B1 | 11/2002 | Thompson et al. | |
| 6,487,540 B1 | 11/2002 | Smith et al. | |
| 6,499,027 B1 | 12/2002 | Weinberger | |
| 6,507,279 B2 | 1/2003 | Loof | |
| 6,507,952 B1 | 1/2003 | Miller et al. | |
| 6,519,693 B1 | 2/2003 | Debey | |
| 6,522,867 B1 | 2/2003 | Wright et al. | |
| 6,529,706 B1 | 3/2003 | Mitchell | |
| 6,538,656 B1 | 3/2003 | Cheung et al. | |
| 6,542,086 B2 | 4/2003 | Baumgartner et al. | |
| 6,549,754 B1 | 4/2003 | Miller et al. | |
| 6,559,812 B1 | 5/2003 | McCarten et al. | |
| 6,570,881 B1 | 5/2003 | Wils et al. | |
| 6,574,338 B1 | 6/2003 | Sachdev | |
| 6,580,402 B2 | 6/2003 | Navarro et al. | |
| 6,594,471 B1 | 7/2003 | Crowley et al. | |

(56) References Cited

U.S. PATENT DOCUMENTS

| | | |
|---|---|---|
| 6,598,227 B1 | 7/2003 | Berry et al. |
| 6,600,418 B2 | 7/2003 | Francis et al. |
| 6,606,056 B2 | 8/2003 | Brogden |
| 6,609,103 B1 | 8/2003 | Kolls |
| 6,611,537 B1 | 8/2003 | Edens et al. |
| 6,618,580 B2 | 9/2003 | Parrott et al. |
| 6,622,124 B1 | 9/2003 | Kolls |
| 6,628,235 B2 | 9/2003 | Wight |
| 6,637,484 B1 | 10/2003 | Kraft |
| 6,643,510 B2 | 11/2003 | Taylor |
| 6,650,898 B2 | 11/2003 | Jochim et al. |
| 6,658,595 B1 | 12/2003 | Thamattoor |
| 6,661,353 B1 | 12/2003 | Gopen |
| 6,674,339 B2 | 1/2004 | Kormanyos |
| 6,674,398 B2 | 1/2004 | Murphy |
| 6,684,240 B1 | 1/2004 | Goddard |
| 6,693,236 B1 | 2/2004 | Gould et al. |
| 6,702,604 B1 | 3/2004 | Moscovitch |
| 6,703,974 B2 | 3/2004 | White et al. |
| 6,707,346 B2 | 3/2004 | Tillotson et al. |
| 6,708,019 B2 | 3/2004 | McLain et al. |
| 6,714,163 B2 | 3/2004 | Navarro et al. |
| 6,725,035 B2 | 4/2004 | Jochim et al. |
| 6,728,535 B2 | 4/2004 | Parkman |
| 6,731,909 B2 | 5/2004 | McLain et al. |
| 6,736,315 B2 | 5/2004 | Swartz |
| 6,741,841 B1 | 5/2004 | Mitchell |
| 6,745,010 B2 | 6/2004 | Wright et al. |
| 6,747,960 B2 | 6/2004 | Tillotson |
| 6,748,597 B1 | 6/2004 | Frisco et al. |
| 6,757,712 B1 | 6/2004 | Bastian et al. |
| 6,771,608 B2 | 8/2004 | Tillotson |
| 6,775,545 B2 | 8/2004 | Wright et al. |
| 6,778,825 B2 | 8/2004 | Parkman |
| 6,782,392 B1 | 8/2004 | Weinberger et al. |
| 6,785,526 B2 | 8/2004 | McLain et al. |
| 6,788,935 B1 | 9/2004 | McKenna et al. |
| 6,796,495 B2 | 9/2004 | Stahl et al. |
| 6,807,148 B1 | 10/2004 | Eicher |
| 6,807,538 B1 | 10/2004 | Weinberger et al. |
| 6,810,527 B1 | 10/2004 | Conrad et al. |
| 6,813,777 B1 | 11/2004 | Weinberger et al. |
| 6,844,855 B2 | 1/2005 | Carson |
| 6,847,801 B2 | 1/2005 | de La Chapelle et al. |
| 6,876,905 B2 | 4/2005 | Farley |
| 6,885,845 B1 | 4/2005 | Crowley et al. |
| 6,885,863 B2 | 4/2005 | Parkman et al. |
| 6,885,864 B2 | 4/2005 | McKenna et al. |
| 6,889,042 B2 | 5/2005 | Rousseau et al. |
| 6,892,052 B2 | 5/2005 | Kotola et al. |
| 6,899,390 B2 | 5/2005 | Sanfrod et al. |
| 6,920,611 B1 | 7/2005 | Spaeth et al. |
| 6,937,164 B2 | 8/2005 | Thomson et al. |
| 6,938,258 B1 | 8/2005 | Weinberger et al. |
| 6,940,978 B2 | 9/2005 | Parkman |
| 6,941,111 B2 | 9/2005 | McLain et al. |
| 6,946,990 B2 | 9/2005 | Monk |
| 6,947,726 B2 | 9/2005 | Rockwell |
| 6,947,733 B2 | 9/2005 | Tillotson |
| 6,959,168 B2 | 10/2005 | Parkman |
| 6,963,304 B2 | 11/2005 | Murphy |
| 6,965,851 B2 | 11/2005 | Tillotson |
| 6,971,608 B2 | 12/2005 | Harrington et al. |
| 6,973,479 B2 | 12/2005 | Brady, Jr. et al. |
| 6,974,076 B1 | 12/2005 | Siegel |
| 6,975,616 B2 | 12/2005 | Stephenson et al. |
| 6,983,312 B1 | 1/2006 | O'Neil |
| 6,985,588 B1 | 1/2006 | Glick et al. |
| 6,985,942 B2 | 1/2006 | D'Annunzio et al. |
| 6,990,338 B2 | 1/2006 | Miller et al. |
| 6,993,288 B2 | 1/2006 | de La Chapelle et al. |
| 6,997,301 B1 * | 2/2006 | Seeley et al. ............ 192/116.5 |
| 7,003,293 B2 | 2/2006 | D'Annunzio |
| 7,023,996 B2 | 4/2006 | Stephenson et al. |
| 7,036,889 B2 | 5/2006 | Sanfrod et al. |
| 7,040,698 B2 | 5/2006 | Park et al. |
| 7,042,528 B2 * | 5/2006 | Lester et al. ............ 348/825 |
| 7,054,593 B2 | 5/2006 | de La Chapelle et al. |
| 7,062,268 B2 | 6/2006 | McKenna |
| 7,068,615 B2 | 6/2006 | Niesen |
| 7,072,634 B2 | 7/2006 | Tillotson |
| 7,085,563 B2 | 8/2006 | Parkman |
| 7,086,081 B2 | 8/2006 | Martinez et al. |
| 7,099,665 B2 | 8/2006 | Taylor |
| 7,100,187 B2 | 8/2006 | Pierzga et al. |
| 7,107,062 B2 | 9/2006 | Cruz et al. |
| 7,113,780 B2 | 9/2006 | McKenna et al. |
| 7,120,389 B2 | 10/2006 | de La Chapelle et al. |
| 7,123,199 B2 | 10/2006 | Rotta |
| 7,124,426 B1 | 10/2006 | Tsuria et al. |
| 7,136,621 B2 | 11/2006 | de La Chapelle et al. |
| 7,139,258 B2 | 11/2006 | Tillotson |
| 7,155,168 B2 | 12/2006 | McLain et al. |
| 7,161,788 B2 | 1/2007 | Richie et al. |
| 7,162,235 B1 | 1/2007 | Gilbert |
| 7,171,197 B2 | 1/2007 | Miller et al. |
| 7,177,638 B2 | 2/2007 | Funderburk et al. |
| 7,187,690 B2 | 3/2007 | Taylor |
| 7,187,927 B1 | 3/2007 | Mitchell |
| 7,233,958 B2 | 6/2007 | Weng et al. |
| 7,250,915 B2 | 7/2007 | Nelson |
| 7,261,266 B2 | 8/2007 | Satterfield |
| 7,274,336 B2 | 9/2007 | Carson |
| 7,280,825 B2 | 10/2007 | Keen et al. |
| 7,286,503 B1 | 10/2007 | Clarke et al. |
| 7,299,013 B2 | 11/2007 | Rotta et al. |
| 7,302,226 B2 | 11/2007 | Stephenson |
| 7,321,383 B2 | 1/2008 | Monagahn et al. |
| 7,328,012 B2 | 2/2008 | Ziarno et al. |
| 7,330,151 B1 | 2/2008 | Monk et al. |
| 7,343,157 B1 | 3/2008 | Mitchell |
| 7,359,700 B2 | 4/2008 | Swensen et al. |
| 7,360,833 B2 | 4/2008 | Vitito |
| 7,362,262 B2 | 4/2008 | Murphy |
| 7,382,327 B2 | 6/2008 | Nelson |
| 7,400,858 B2 | 7/2008 | Crowley et al. |
| 7,406,309 B2 | 7/2008 | Usher et al. |
| 7,414,573 B2 | 8/2008 | Murphy |
| 7,437,125 B2 | 10/2008 | McLain et al. |
| 7,448,679 B2 | 11/2008 | Chang |
| 7,450,901 B2 | 11/2008 | Parkman |
| 7,454,202 B2 | 11/2008 | de La Chapelle |
| 7,454,203 B2 | 11/2008 | Levitan |
| 7,460,866 B2 | 12/2008 | Salkini et al. |
| 7,483,696 B1 | 1/2009 | Mitchell |
| 7,486,927 B2 | 2/2009 | Kallio et al. |
| 7,496,361 B1 | 2/2009 | Mitchell et al. |
| 7,508,342 B2 | 3/2009 | Nelson |
| 7,542,052 B2 | 6/2009 | Solomon et al. |
| 7,690,012 B2 | 3/2010 | Luehrs |
| 7,904,244 B2 | 3/2011 | Sugla |
| 2001/0025377 A1 | 9/2001 | Hinderks |
| 2002/0013150 A1 | 1/2002 | McKenna et al. |
| 2002/0045444 A1 | 4/2002 | User et al. |
| 2002/0045484 A1 | 4/2002 | Eck |
| 2002/0046406 A1 | 4/2002 | Chelehmal et al. |
| 2002/0058478 A1 | 5/2002 | de La Chapelle et al. |
| 2002/0059363 A1 | 5/2002 | Katz et al. |
| 2002/0059614 A1 | 5/2002 | Lipsanen et al. |
| 2002/0065698 A1 | 5/2002 | Schick |
| 2002/0065711 A1 | 5/2002 | Fujisawa et al. |
| 2002/0069293 A1 | 6/2002 | Natalio |
| 2002/0087992 A1 | 7/2002 | Bengeult et al. |
| 2002/0093564 A1 | 7/2002 | Israel |
| 2002/0094829 A1 | 7/2002 | Ritter |
| 2002/0095680 A1 | 7/2002 | Davidson |
| 2002/0136540 A1 | 9/2002 | Adams et al. |
| 2002/0152470 A1 | 10/2002 | Hammond |
| 2002/0162113 A1 | 10/2002 | Hunter et al. |
| 2002/0164960 A1 | 11/2002 | Slaughter et al. |
| 2002/0170060 A1 | 11/2002 | Lyman |
| 2002/0178451 A1 | 11/2002 | Ficco |
| 2002/0184555 A1 | 12/2002 | Wong |
| 2002/0197990 A1 | 12/2002 | Jochim et al. |

(56) References Cited

U.S. PATENT DOCUMENTS

| | | |
|---|---|---|
| 2003/0003899 A1 | 1/2003 | Tashiro et al. |
| 2003/0008652 A1 | 1/2003 | Jochim et al. |
| 2003/0020991 A1 | 1/2003 | Chang |
| 2003/0043760 A1 | 3/2003 | Taylor |
| 2003/0047647 A1 | 3/2003 | Poblete |
| 2003/0055975 A1 | 3/2003 | Nelson et al. |
| 2003/0060190 A1 | 3/2003 | Mallart |
| 2003/0067542 A1 | 4/2003 | Monroe |
| 2003/0069015 A1 | 4/2003 | Brinkley et al. |
| 2003/0069990 A1 | 4/2003 | D'Annunzio et al. |
| 2003/0077308 A1 | 4/2003 | Rosen |
| 2003/0084130 A1 | 5/2003 | D'Annunzio |
| 2003/0084451 A1 | 5/2003 | Pierzga et al. |
| 2003/0085818 A1 | 5/2003 | Renton et al. |
| 2003/0087672 A1 | 5/2003 | Kattukaran et al. |
| 2003/0093798 A1 | 5/2003 | Rogerson |
| 2003/0107248 A1 | 6/2003 | Sanford et al. |
| 2003/0126614 A1 | 7/2003 | Staiger |
| 2003/0130769 A1 | 7/2003 | Farley et al. |
| 2003/0140345 A1 | 7/2003 | Fisk et al. |
| 2003/0148736 A1 | 8/2003 | Wright et al. |
| 2003/0158958 A1 | 8/2003 | Chiu |
| 2003/0160710 A1 | 8/2003 | Baumgartner et al. |
| 2003/0161411 A1 | 8/2003 | McCorkle et al. |
| 2003/0169563 A1 | 9/2003 | Adams |
| 2003/0184449 A1 | 10/2003 | Baumgartner et al. |
| 2003/0217363 A1 | 11/2003 | Brady, Jr. et al. |
| 2003/0233469 A1 | 12/2003 | Knowlson et al. |
| 2003/0233658 A1 | 12/2003 | Keen et al. |
| 2003/0237016 A1 | 12/2003 | Johnson et al. |
| 2004/0001303 A1 | 1/2004 | Doblar et al. |
| 2004/0049797 A1 | 3/2004 | Salmonsen |
| 2004/0054923 A1 | 3/2004 | Seago et al. |
| 2004/0077308 A1 | 4/2004 | Sanford et al. |
| 2004/0078821 A1 | 4/2004 | Frisco et al. |
| 2004/0088412 A1 | 5/2004 | John et al. |
| 2004/0098745 A1 | 5/2004 | Marston et al. |
| 2004/0108963 A1 | 6/2004 | Clymer et al. |
| 2004/0111523 A1 | 6/2004 | Hall et al. |
| 2004/0123322 A1 | 6/2004 | Erkocevic et al. |
| 2004/0128688 A1 | 7/2004 | Seo |
| 2004/0133634 A1 | 7/2004 | Luke et al. |
| 2004/0139467 A1 | 7/2004 | Rogerson et al. |
| 2004/0142658 A1 | 7/2004 | McKenna et al. |
| 2004/0158863 A1 | 8/2004 | McLain |
| 2004/0167967 A1 | 8/2004 | Bastian et al. |
| 2004/0183346 A1 | 9/2004 | Sanford et al. |
| 2004/0192339 A1 | 9/2004 | Wilson et al. |
| 2004/0198346 A1 | 10/2004 | Swensen et al. |
| 2004/0235469 A1 | 11/2004 | Krug |
| 2004/0252965 A1 | 12/2004 | Moreno et al. |
| 2004/0252966 A1 | 12/2004 | Holloway et al. |
| 2004/0253951 A1 | 12/2004 | Chang et al. |
| 2005/0021602 A1 | 1/2005 | Noel et al. |
| 2005/0026608 A1 | 2/2005 | Kallio et al. |
| 2005/0027787 A1 | 2/2005 | Kuhn et al. |
| 2005/0039208 A1 | 2/2005 | Veeck et al. |
| 2005/0044564 A1 | 2/2005 | Stopniewicz et al. |
| 2005/0047081 A1 | 3/2005 | LaPorte et al. |
| 2005/0067530 A1 | 3/2005 | Schafer, Jr. et al. |
| 2005/0102322 A1 | 5/2005 | Bagley et al. |
| 2005/0111182 A1 | 5/2005 | Lin et al. |
| 2005/0114894 A1 | 5/2005 | Hoerl |
| 2005/0132407 A1 | 6/2005 | Boyer et al. |
| 2005/0136917 A1 | 6/2005 | Taylor |
| 2005/0138654 A1 | 6/2005 | Minne |
| 2005/0171653 A1 | 8/2005 | Taylor |
| 2005/0176368 A1 | 8/2005 | Young et al. |
| 2005/0177763 A1 | 8/2005 | Stoler |
| 2005/0181723 A1 | 8/2005 | Miller et al. |
| 2005/0193257 A1 | 9/2005 | Stoler |
| 2005/0202785 A1 | 9/2005 | Meyer |
| 2005/0215249 A1 | 9/2005 | Little et al. |
| 2005/0216938 A1 | 9/2005 | Brady et al. |
| 2005/0239261 A1 | 10/2005 | Tai et al. |
| 2005/0242636 A1 | 11/2005 | Vitito |
| 2005/0242637 A1 | 11/2005 | Vitito |
| 2005/0242638 A1 | 11/2005 | Vitito |
| 2005/0251798 A1 | 11/2005 | Fraley |
| 2005/0256616 A1 | 11/2005 | Rhoads |
| 2005/0268319 A1 | 12/2005 | Brady |
| 2005/0268320 A1 | 12/2005 | Smith |
| 2005/0270373 A1 | 12/2005 | Trela |
| 2005/0273823 A1 | 12/2005 | Brady, Jr. et al. |
| 2005/0278753 A1 | 12/2005 | Brady, Jr. et al. |
| 2005/0278754 A1 | 12/2005 | Bleacher et al. |
| 2005/0281223 A1 | 12/2005 | D'Annunzio |
| 2006/0006287 A1 | 1/2006 | Ferguson et al. |
| 2006/0008256 A1 | 1/2006 | Khedouri et al. |
| 2006/0010438 A1 | 1/2006 | Brady, Jr. et al. |
| 2006/0030311 A1 | 2/2006 | Cruz et al. |
| 2006/0032979 A1 | 2/2006 | Mitchell et al. |
| 2006/0040612 A1 | 2/2006 | Min |
| 2006/0040660 A1 | 2/2006 | Cruz et al. |
| 2006/0047426 A1 | 3/2006 | Vitito |
| 2006/0048196 A1 | 3/2006 | Yau |
| 2006/0088001 A1 | 4/2006 | Reitmann et al. |
| 2006/0107295 A1 | 5/2006 | Margis et al. |
| 2006/0119151 A1 | 6/2006 | Vitito |
| 2006/0128303 A1 | 6/2006 | Schedivy |
| 2006/0143662 A1 | 6/2006 | Easterling et al. |
| 2006/0154601 A1 | 7/2006 | Tewalt et al. |
| 2006/0174285 A1 | 8/2006 | Brady, Jr. et al. |
| 2006/0183450 A1 | 8/2006 | Cameron |
| 2006/0187959 A1 | 8/2006 | Kawaguchi et al. |
| 2006/0197750 A1 | 9/2006 | Kerr |
| 2006/0212909 A1 | 9/2006 | Girard et al. |
| 2006/0217121 A1 | 9/2006 | Soliman et al. |
| 2006/0234700 A1 | 10/2006 | Funderburk et al. |
| 2006/0250947 A1 | 11/2006 | Allen |
| 2006/0264173 A1 | 11/2006 | Gilbert |
| 2006/0270373 A1 | 11/2006 | So |
| 2006/0270470 A1 | 11/2006 | de La Chapelle et al. |
| 2006/0276127 A1 | 12/2006 | Cruz et al. |
| 2006/0277589 A1 | 12/2006 | Margis et al. |
| 2006/0291803 A1 | 12/2006 | Watson et al. |
| 2006/0293190 A1 | 12/2006 | Watson et al. |
| 2007/0021117 A1 | 1/2007 | McKenna et al. |
| 2007/0022018 A1 | 1/2007 | Suryanarayana et al. |
| 2007/0025240 A1 | 2/2007 | Snide |
| 2007/0026795 A1 | 2/2007 | De La Chapelle |
| 2007/0042772 A1 | 2/2007 | Salkini et al. |
| 2007/0044126 A1 | 2/2007 | Mitchell |
| 2007/0060133 A1 | 3/2007 | Spitzer et al. |
| 2007/0112487 A1 | 5/2007 | Avery |
| 2007/0130599 A1 | 6/2007 | Monroe |
| 2007/0155421 A1 | 7/2007 | Alberth et al. |
| 2007/0185977 A1 | 8/2007 | Sato et al. |
| 2007/0202802 A1 | 8/2007 | Kallio et al. |
| 2007/0213009 A1 | 9/2007 | Higashida et al. |
| 2007/0258417 A1 | 11/2007 | Harvey et al. |
| 2007/0298741 A1 | 12/2007 | Harnist et al. |
| 2008/0004016 A1 | 1/2008 | Smee et al. |
| 2008/0023600 A1 | 1/2008 | Perlman |
| 2008/0040756 A1 | 2/2008 | Perlman |
| 2008/0084882 A1 | 4/2008 | Eruchimovitch |
| 2008/0085691 A1 | 4/2008 | Harvey et al. |
| 2008/0090567 A1 | 4/2008 | Gilbert |
| 2008/0124054 A1 | 5/2008 | Bonar |
| 2008/0125112 A1 | 5/2008 | Clarke et al. |
| 2008/0127278 A1 | 5/2008 | Bonar |
| 2008/0130539 A1 | 6/2008 | Lauer et al. |
| 2008/0133705 A1 | 6/2008 | Lemond et al. |
| 2008/0141314 A1 | 6/2008 | Lemond et al. |
| 2008/0181169 A1 | 7/2008 | Lauer et al. |
| 2008/0182573 A1 | 7/2008 | Lauer et al. |
| 2008/0255722 A1 | 10/2008 | McClellan |
| 2008/0274734 A1 | 11/2008 | Kostanic et al. |
| 2008/0299965 A1 | 12/2008 | Lagerman |
| 2008/0305762 A1 | 12/2008 | Malosh |
| 2009/0007193 A1 | 1/2009 | Correa et al. |
| 2009/0010200 A1 | 1/2009 | Lauer et al. |
| 2009/0042651 A1 | 2/2009 | Prabhu et al. |

(56) References Cited

U.S. PATENT DOCUMENTS

| | | | |
|---|---|---|---|
| 2009/0077595 A1 | 3/2009 | Sizelove et al. |
| 2009/0083805 A1 | 3/2009 | Sizelove et al. |
| 2009/0094635 A1 | 4/2009 | Aslin et al. |

FOREIGN PATENT DOCUMENTS

| | | |
|---|---|---|
| EP | 0 277 014 B1 | 8/1988 |
| EP | 0 577 054 A1 | 1/1994 |
| EP | 0 767 594 A2 | 9/1997 |
| EP | 0 890 907 A1 | 1/1999 |
| EP | 0 930 513 A2 | 7/1999 |
| EP | 1 078 852 A2 | 2/2001 |
| EP | 1 217 833 A2 | 6/2002 |
| EP | 1 231 534 A1 | 8/2002 |
| EP | 1 217 833 A3 | 4/2004 |
| EP | 1 458 590 A1 | 6/2005 |
| JP | 58-46485 | 3/1983 |
| JP | 62-238693 | 10/1987 |
| JP | H06-285259 A | 10/1994 |
| JP | H09-512401 A | 11/1995 |
| JP | 2003-534959 A | 4/2000 |
| JP | 2003-140804 A | 5/2003 |
| JP | 2005-045490 A | 2/2005 |
| JP | 2005-528030 A | 9/2005 |
| JP | 2006-527540 A | 11/2006 |
| WO | WO 99/14655 A1 | 3/1999 |
| WO | WO 00/14987 A1 | 3/2000 |
| WO | WO 02/084971 A2 | 10/2002 |
| WO | WO 03/024110 A1 | 3/2003 |
| WO | WO 03/032503 A2 | 4/2003 |
| WO | WO 03/050000 A1 | 6/2003 |
| WO | WO 03/024085 A2 | 8/2003 |
| WO | WO 2004/003696 A2 | 1/2004 |
| WO | WO 2004/008277 A2 | 1/2004 |
| WO | WO 2005/086865 A2 | 9/2005 |
| WO | WO 2005/120068 A3 | 12/2005 |
| WO | WO 2005/125207 A2 | 12/2005 |
| WO | WO 2006/052941 A1 | 5/2006 |
| WO | WO 2006/062641 A2 | 6/2006 |
| WO | WO 2006/065381 A2 | 6/2006 |
| WO | WO 2009/021933 A1 | 2/2009 |
| WO | WO 2009021933 A1 * | 2/2009 |
| WO | WO 2010/028293 A2 | 3/2010 |

OTHER PUBLICATIONS

Office Action, EP Application No. 08 830 787.1, Dec. 9, 2011.
Chen Y. et al., Personalized Multimedia Services Using a Mobile Service Platform, 2002 IEEE, 0-7803-7376-6/02, Mar. 17, 2002, pp. 918-925.
Gratschew, S., et al., A Multimedia Messaging Platform for Content Delivering, 2003 IEEE, 0-7803-7661-7/03, Feb. 23, 2003, pp. 431-435.
Ibenthal, A. et al.,"Multimedia im Fahrzeug: Dienste und Technik", Femseh und Kino-Technik 54, Jahrgag Nr. 3/20, pp. 100-105.
Kartalopoulos S V: "Consumer Communications in the Next Generation Access Network" Consumer Communications and Networking Conference, 2004. CCNC 2004.
Farries, M. et al: "Optical Branching Devices for Avionic Passive Optical Network" Avionics, Fiber-Optics and Photonics Technology Conference, 2007 IEEE, IEEE, PI, 1.
International Search Report, PCT/US2011/033900, Aug. 4, 2011.
Chinese Office Action, Application No. 20088017132.7, Jul. 22, 2011.
Office Action, CN Appln No. 200880115267.8, Dec. 24, 2012.
Office Action, JP Appln No. 2010-525047, Dec. 25, 2012.
Office Action, JP Appln No. 2010-525045, Mar. 5, 2013.
Office Action, JP Appln No. 2010-525046, Mar. 5, 2013.
Office Action, CN Appln No. 20880107089.4, Mar. 7, 2013.
Office Action, Japanese Application No. 2009-523977, Jul. 17, 2012.
Office Action, Chinese Application No. 200780029616.X, Apr. 17, 2013.
Office Action, Japanese Application No. 2010-525043, May 7, 2013.
Office Action, Chinese Application No. 200880107132.7, Jun. 7, 2013.

* cited by examiner

To Vehicle
Information
System

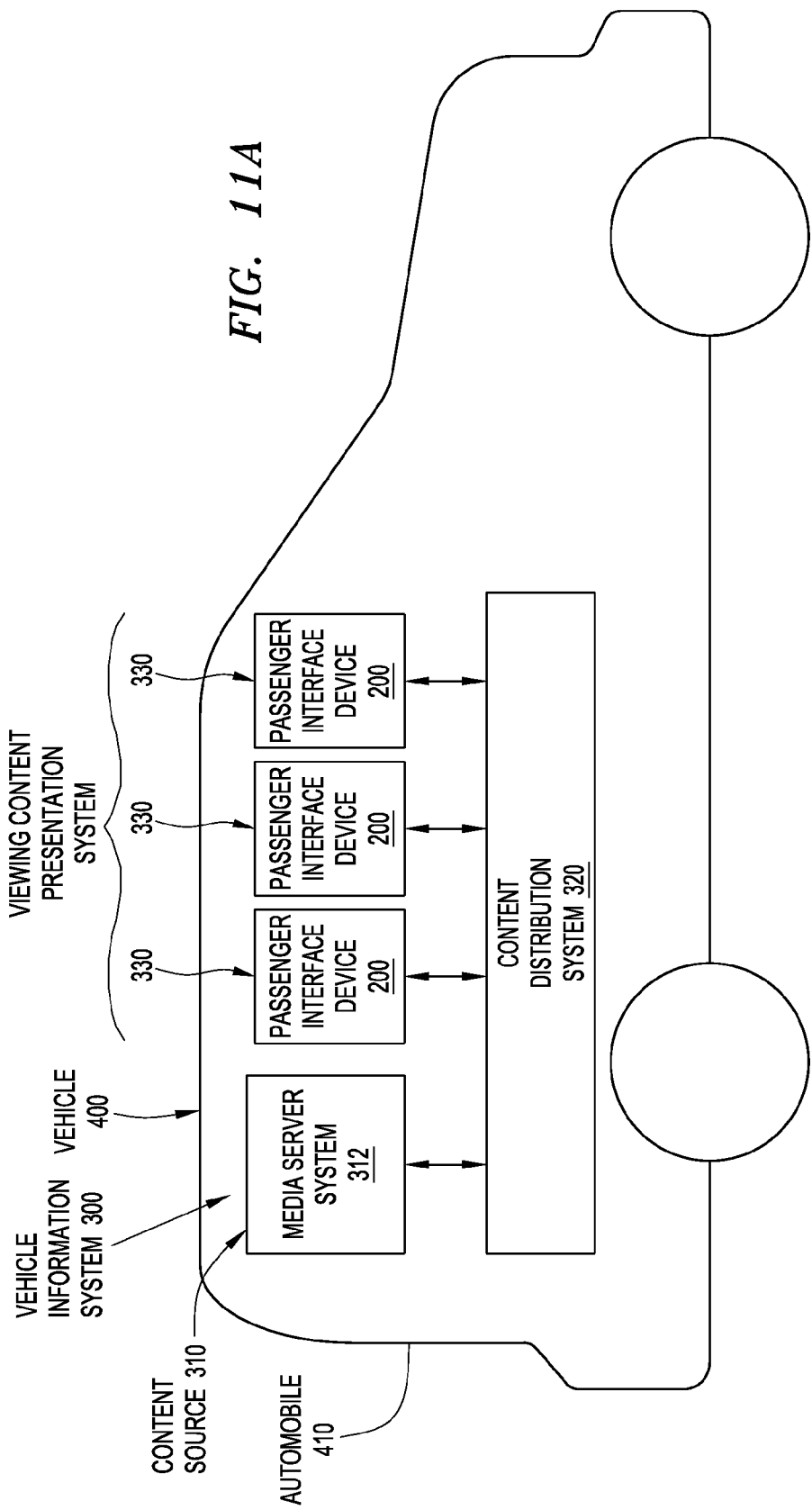

DEPLOYMENT SYSTEM AND METHOD FOR USER INTERFACE DEVICES

CROSS-REFERENCE TO RELATED APPLICATIONS

This application claims priority to U.S. provisional patent application, Ser. No. 61/343,368, filed Apr. 27, 2010. Priority to the provisional patent application is expressly claimed, and the disclosure of the provisional application is hereby incorporated herein by reference in its entirety and for all purposes.

FIELD

The present invention relates generally to mounting systems and more particularly, but not exclusively, to seat-based mounting systems suitable for use with user interface devices of vehicle information systems installed aboard passenger vehicles.

BACKGROUND

Passenger vehicles, such as automobiles and aircraft, often include vehicle information systems for satisfying passenger demand for access to viewing content, such as information or entertainment content, while traveling.

Conventional vehicle information systems typically include seat video presentations systems with individual controls such that viewing content is selectable by the passengers. The viewing content can include audio and video materials that are derived from a variety of content sources. Prerecorded viewing content, such as motion pictures and music, can be provided by internal content sources, such as audio and video players, that are installed in the vehicle. The conventional vehicle information systems likewise can include an antenna system for receiving viewing content, such as live television programming, transmitted from one or more content providers (or sources) that are external to, and/or remote from, the vehicle.

As illustrated in FIGS. 1A-B, several mounting options exist when video display systems 550 are disposed adjacent to a passenger seat 440 within a passenger compartment 430 of a passenger vehicle 400. For example, the video display system 550 typically is mounted on a facing seatback 442 or an armrest 444 of the passenger seat 440. When installed at the seat armrest 440, the video display system 550 is mounted on an intermediate support arm 500 for coupling the video display system 550 and the seat armrest 440. The support arm 500 extends from the seat armrest 440 into a deployed position and allows a position of the video display system 550 to be adjusted relative to the passenger seat 440. As desired, a viewing angle of the video display system 550 can readily be changed to enhance enjoyment of the presented viewing content. FIG. 1B shows the video display system 550 of FIG. 1A in a stowed position. As illustrated in FIG. 1B, the passenger seat 440 is shown as including an internal compartment 446 for stowing the video display system 550 when not in use.

A detail drawing of a typical prior art support arm 500 is illustrated in FIG. 2. Exemplary support arms are shown and described in the co-pending U.S. patent applications: "SYSTEM AND METHOD FOR MOUNTING USER INTERFACE DEVICES," Ser. No. 11/828,193, filed on Jul. 25, 2007; and "USER INTERFACE device AND METHOD FOR PRESENTING VIEWING CONTENT," Ser. No. 11/835,371, filed on Aug. 7, 2007, which are assigned to the assignee of the present application and the respective disclosures of which are hereby incorporated herein by reference in their entireties and for all purposes. As shown in FIG. 2, the support arm 500 includes a central support member 510. The support member 510 couples with the seat armrest 440 (shown in FIGS. 1A-B) via a first rotatable joint 520 and couples with the video display system 550 via a second rotatable joint 530. The first rotatable joint 520 enables the support member 510 to rotate relative to the seat armrest 440; whereas, the second rotatable joint 530 permits the video display system 550 to rotate relative to the support member 510.

The support arm 500 also defines an internal channel 515 for receiving a video communication cable 540. The internal channel 515 is formed within each of the support member 510 and the rotatable joints 520, 530. The video communication cable 540 thereby can be fed from the passenger seat 440 (shown in FIGS. 1A-B) through internal channel 515 formed by the rotatable joint 520, the support member 510, and the rotatable joint 530 to the video display system 550. In operation, the video communication cable 540 transmits video content from the vehicle information system for presentation via the video display system 550. Since conventional video communication cables 540 only transmit video content to the video display systems 550, the video communication cables 540 have few conductors and relatively small diameters.

More recently, additional functionality has incorporated into the video display systems 550, and vehicle information systems have been adapted to incorporate communication ports (or jacks or connectors) and/or interactive user (or passenger) interface devices the passenger seats 440 (shown in FIGS. 1A-B). Exemplary enhanced capabilities include support for power signals, video signals, audio signals, control signals, touchscreen display systems, personal media devices, Universal Serial Bus (USB) devices, and other functions. These enhanced capabilities have resulted in a greater number of conductors within the video communication cable 540 within the support arm 500 and a corresponding increase in the diameter of the video communication cable 540.

The support arm 500 therefore requires modification (and/or redesign) to accommodate larger video communication cable 540. For example, the dimension (bore, cross-section, and/or bend radii) of the internal channel 515 must increase to accommodate the thicker video communication cable 540; while, space limitations within the passenger compartment 430 restrict changes to the external dimensions of the support arm 500. The thicker video communication cable 540 likewise is less flexible than the traditional video communication cables 540 and is difficult to pass through the internal channel 515 during installation. Further, as the rotatable joints 520, 530 are rotated, the thicker video communication cable 540 within the support arm 500 can be subject to cable chaffing, breakage, and/or other malfunctions.

The enhanced capabilities associated the video display systems 550, communication ports, and/or interactive user (or passenger) interface devices also results in an increase in the amount of weight to be supported by the support arm 500. Accordingly, the support arm 500 requires further modification (and/or redesign) in order to support the increased weight. The rotatable joints 520, 530, for example, should be sufficiently firm for supporting the heavier video display systems 550 in the deployed position, regardless of the selected viewing angle, but without requiring excessive force to be applied to the support arm 500 for returning the video display systems 550 to the stowed position. In addition, conventional support arms 500 can easily fall when deployed in intermediate deployment positions, resulting in injuries to users and damage to the video display systems 550.

In view of the foregoing, a need exists for an improved system and method for mounting video presentation systems and other user interface devices that overcome the aforementioned obstacles and deficiencies of conventional mounting systems.

BRIEF DESCRIPTION OF THE DRAWINGS

FIG. 11A is an exemplary top-level drawing illustrating a vehicle information system installed aboard an automobile.

Figure 1A:
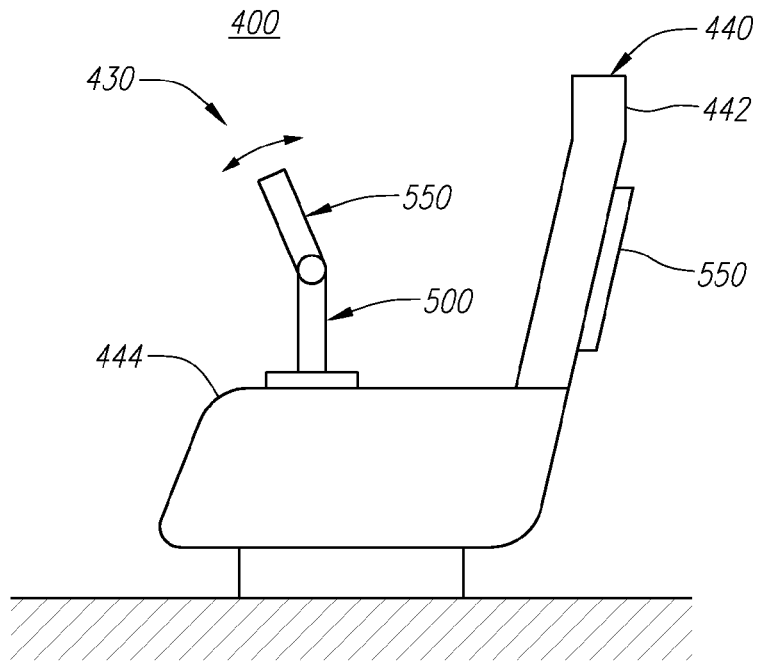
FIG. 1A shows a prior art support arm for a video display system installed at an armrest of a passenger seat, wherein the video display system is illustrated in a deployed position.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available video support arms are incompatible with heavier video display systems and larger communication cables necessary for providing additional functionality demanded by sophisticated users, a deployment system for user interface devices that supports this additional functionality can prove desirable and provide a basis for a wide range of system applications, such as vehicle information systems for installation and use aboard automobiles, aircraft, and other types of passenger vehicles during travel. This result can be achieved, according to one embodiment disclosed herein, by a deployment system 100 as illustrated in FIG. 3.

Figure 3:
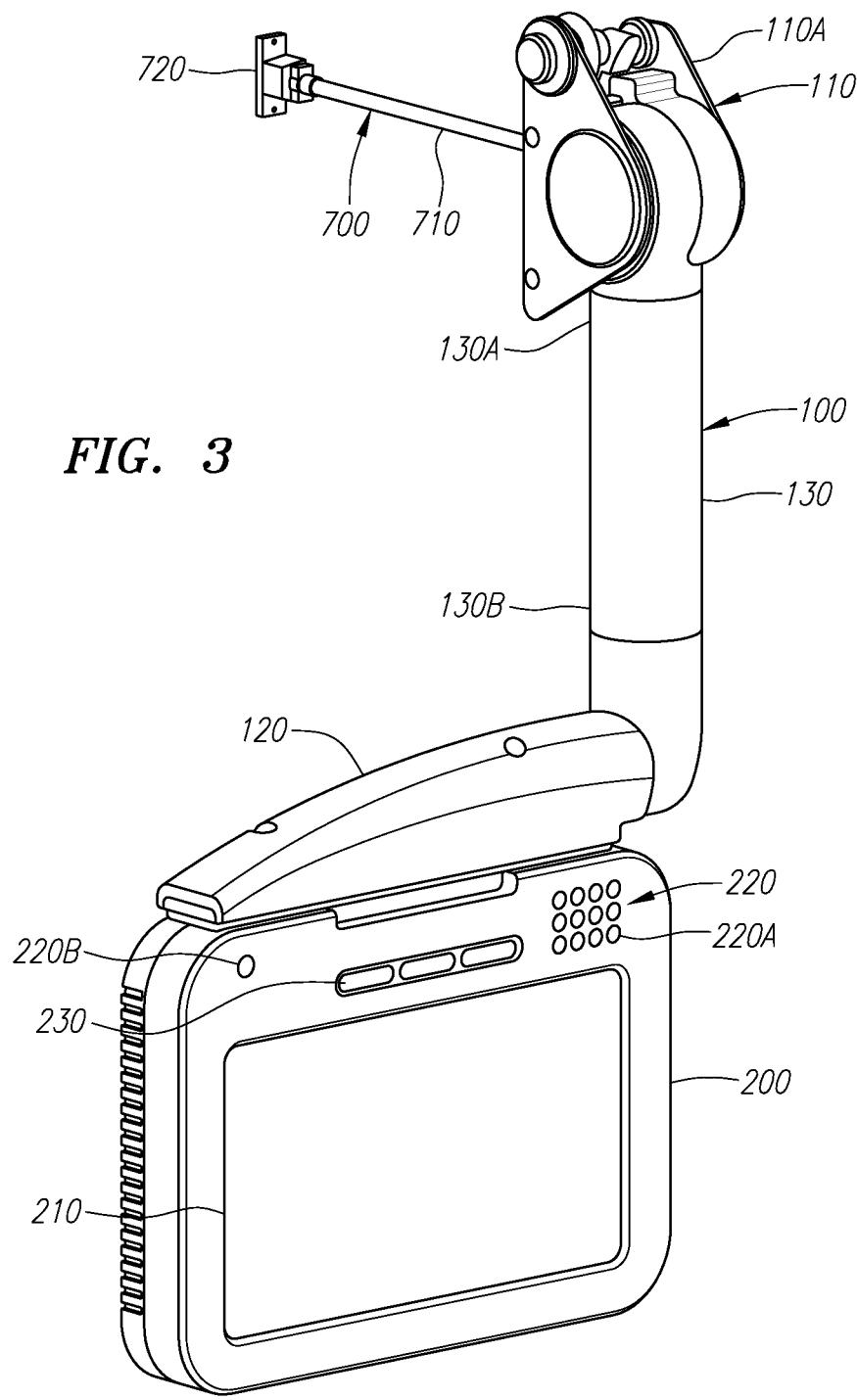
FIG. 3 is an exemplary top-level drawing illustrating an embodiment of a deployment system for user interface devices.
Figure 11B:
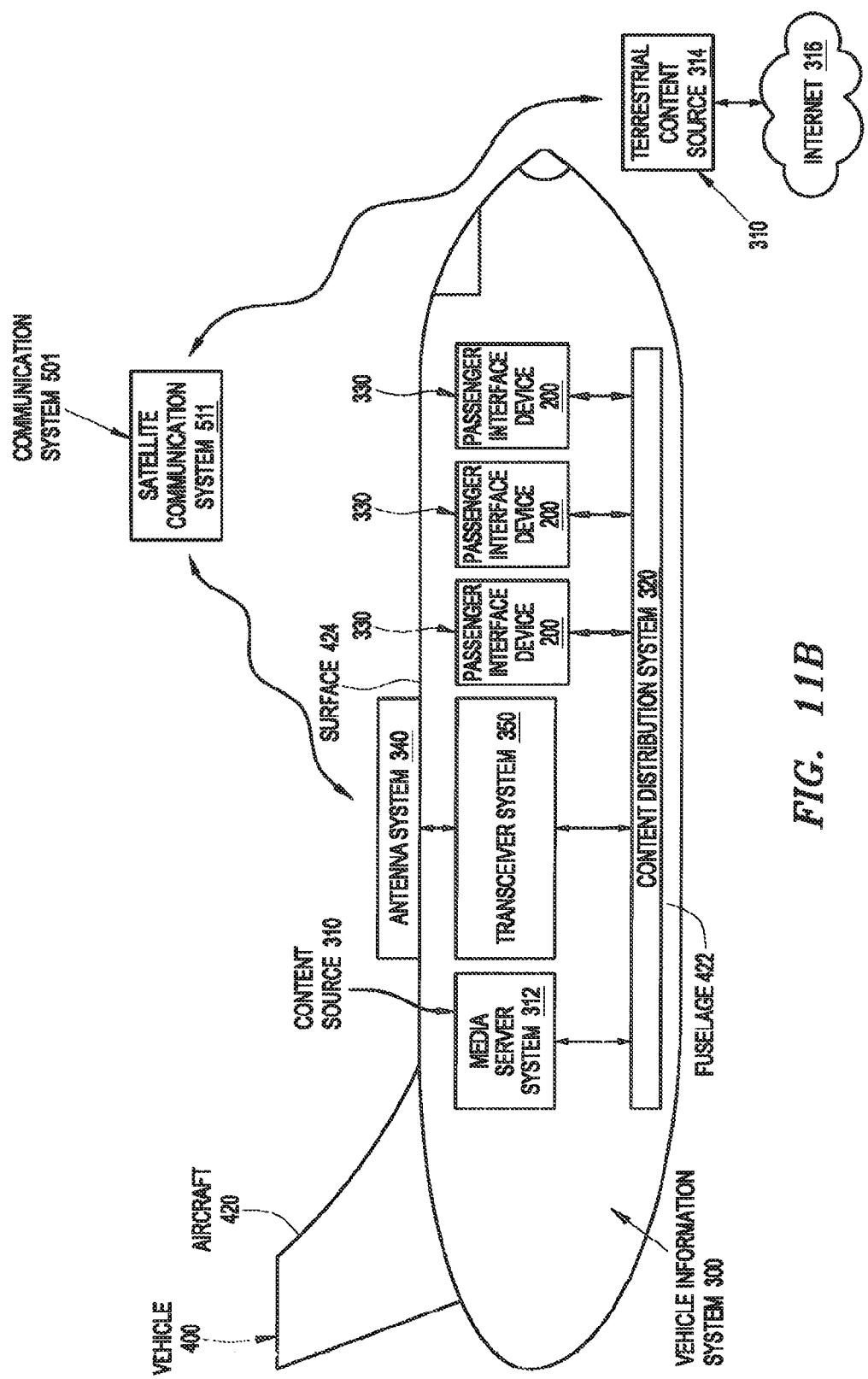
FIG. 11B is an exemplary top-level drawing illustrating the vehicle information system of FIG. 11A, wherein the vehicle information system is installed aboard an aircraft.

Turning to FIG. 3, the deployment system 100 can support a selected user (or passenger) interface device 200 and couple the user interface device 200 with a content system (or source) 310 (shown in FIGS. 11A-B) associated with a proximate and/or remote information system, such as a vehicle information system 300 (shown in FIGS. 11A-B). Illustrative user interface devices 200 are shown and described in the co-pending U.S. patent applications, entitled "SYSTEM AND METHOD FOR DOWNLOADING FILES," application Ser. No. 10/772,565, filed on Feb. 4, 2004; entitled "PORTABLE MEDIA DEVICE AND METHOD FOR PRESENTING VIEWING CONTENT DURING TRAVEL," application Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," application Ser. No. 11/269,378, filed on Nov. 7, 2005; entitled "SYSTEM AND METHOD FOR INTERFACING A PORTABLE MEDIA DEVICE WITH A VEHICLE INFORMATION SYSTEM," application Ser. No. 12/210,624, filed on Sep. 15, 2008; entitled "MEDIA DEVICE INTERFACE SYSTEM AND METHOD FOR VEHICLE INFORMATION SYSTEMS," application Ser. No. 12/210,636, filed on Sep. 15, 2008; entitled "MEDIA DEVICE INTERFACE SYSTEM AND METHOD FOR VEHICLE INFORMATION SYSTEMS," application Ser. No. 12/210,652, filed on Sep. 15, 2008; and entitled "PORTABLE USER CONTROL DEVICE AND METHOD FOR VEHICLE INFORMATION SYSTEMS," application Ser. No. 12/210,689, filed on Sep. 15, 2008, which are assigned to the assignee of the present application and the respective disclosures of which are hereby incorporated herein by reference in their entireties and for all purposes.

Alternatively, and/or in addition, the user interface device 200 can be provided as a handheld device, such as a personal media device, a laptop computer, a palmtop computer, a personal digital assistant (PDA), a cellular telephone, an iPod® device, an iPhone® device, an iPad® device, and/or a MPEG Audio Layer 3 (MP3) device in the manner disclosed in the above-referenced co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005, "SYSTEM AND METHOD FOR INTERFACING A PORTABLE MEDIA DEVICE WITH A VEHICLE INFORMA- TION SYSTEM," application Ser. No. 12/210,624, filed on Sep. 15, 2008; entitled "MEDIA DEVICE INTERFACE SYSTEM AND METHOD FOR VEHICLE INFORMATION SYSTEMS," application Ser. No. 12/210,636, filed on Sep. 15, 2008; entitled "MEDIA DEVICE INTERFACE SYSTEM AND METHOD FOR VEHICLE INFORMATION SYSTEMS," application Ser. No. 12/210,652, filed on Sep. 15, 2008; and entitled "PORTABLE USER CONTROL DEVICE AND METHOD FOR VEHICLE INFORMATION SYSTEMS," application Ser. No. 12/210,689, filed on Sep. 15, 2008, which applications were incorporated herein by reference above.

The deployment system 100 is shown as including a main rotating joint system 110 and a device mounting assembly 120. The main rotating joint system 110 enables the deployment system 100 to be installed at any suitable installation location such as a wall, a ceiling, and/or a bulkhead. In one embodiment, the deployment system 100 can be disposed at a user (and/or passenger) seat 440 (shown in FIGS. 13A-B). The deployment system 100 can be provided at any conventional location of the user seat 440, including, for example, at a seatback 442 (shown in FIGS. 13A-B) and/or an armrest 444 (shown in FIGS. 13A-B) of the user seat 440. Being configured to receive the selected user interface device 200, the device mounting assembly 120 includes a suitable device communication connector (or port) 730 (shown in FIG. 4A).

Advantageously, the main rotating joint system 110 can enable the deployment system 100 to receive a communication cable 710 of a communication cable assembly 700 for coupling the deployment system 100 with the content source 310. The communication cable 710 is shown as being terminated with a suitable system communication connector (or port) 720 for coupling the deployment system 100 with the content source 310 and likewise is terminated by the device communication connector 730 of the device mounting assembly 120. Thereby, when the selected user interface device 200 is disposed upon the device mounting assembly 120, the deployment system 100 enables the selected user interface device 200 to communicate with the content source 310 via the communication cable assembly 700.

The embodiment of the deployment system 100 of FIG. 3 is shown as including an optional extension support system 130 for coupling the main rotating joint system 110 with the device mounting assembly 120. The extension support system 130 can include a first (or proximate) coupling region 130A for coupling with the main rotating joint system 110 and a second (or distal) coupling region 130B for coupling with the device mounting assembly 120. Although shown as comprising opposite end regions for purposes of illustration only, the coupling regions 130A, 130B each can be disposed at any suitable location of the extension support system 130.

As illustrated in FIG. 3, the user interface device 200 can include a video presentation system 210 for visually presenting a video portion of viewing content (not shown) provided by the content source 310. The viewing content can comprise any conventional type of audible and/or visible viewing content, such as stored (or time-delayed) viewing content and/or, live (or real-time) viewing content, in the manner set forth in the above-referenced co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, which applications were incorporated herein by reference above.

As desired, the viewing content can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety. Alternatively, and/or in addition to entertainment content, such as live satellite television programming and/or live satellite radio programming, the viewing content likewise can include two-way communications such as real-time access to the Internet 316 (shown in FIG. 11B) and/or telecommunications in the manner set forth in U.S. Pat. No. 5,568,484, entitled "TELECOMMUNICATIONS SYSTEM AND METHOD FOR USE ON COMMERCIAL AIRCRAFT AND OTHER VEHICLES," which is assigned to the assignee of the present application and the disclosure of which is hereby incorporated herein by reference in its entirety. It is understood that the exemplary viewing content as shown and described herein are not exhaustive and are provided herein for purposes of illustration only and not for purposes of limitation.

The viewing content can be selected from viewing content stored internally within the user interface device 200 and/or provided by a source, such as another user interface device 200 and/or a selected content source 310 (shown in FIGS. 11A-B), external to the user interface device 200. Illustrative content sources 310 are shown and described in the co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, which applications were incorporated herein by reference above.

The user interface device 200 preferably includes at least one advanced function in the manner set forth in more above. For example, the user interface device 200 can include an audio presentation system 220 for audibly presenting an audio portion of the viewing content. The audio presentation system 220 can be provided in any conventional manner, such as via one or more integrated speaker systems 220A and/or audio communication connectors (or jacks or ports) 220B. The audio connectors 220B enable the audio viewing content to be presented via a peripheral audio system, such as headphones and/or an external speaker system. In one embodiment, the audio presentation system 220 includes at least one sound enhancement feature such as noise cancellation, surround sound, etc.

Alternatively, and/or additionally, the user interface device 200 can include an input system 230 for selecting the viewing content and/or controlling the presentation of the selected viewing content. Although shown in FIG. 3 as comprising one or more switches (or pushbuttons), such as a keyboard or a keypad, the input system 230 can be provided in any conventional manner and can include a pointing device (not shown), such as a mouse, trackball, or stylus. As desired, the input system 230 can be at least partially integrated with, and/or separable from, the user interface device 200. The input system 230 likewise can include one or more communication ports (not shown) for coupling a peripheral input device (not shown), such as a full-size computer keyboard, an external mouse, and/or a game pad, with the user interface device 200. As desired, the input system 230 can be at least partially combined with the video presentation system 210. The input system 230 thereby can comprise a touchscreen system and/or a menu system for selecting viewing content.

Figure 2:
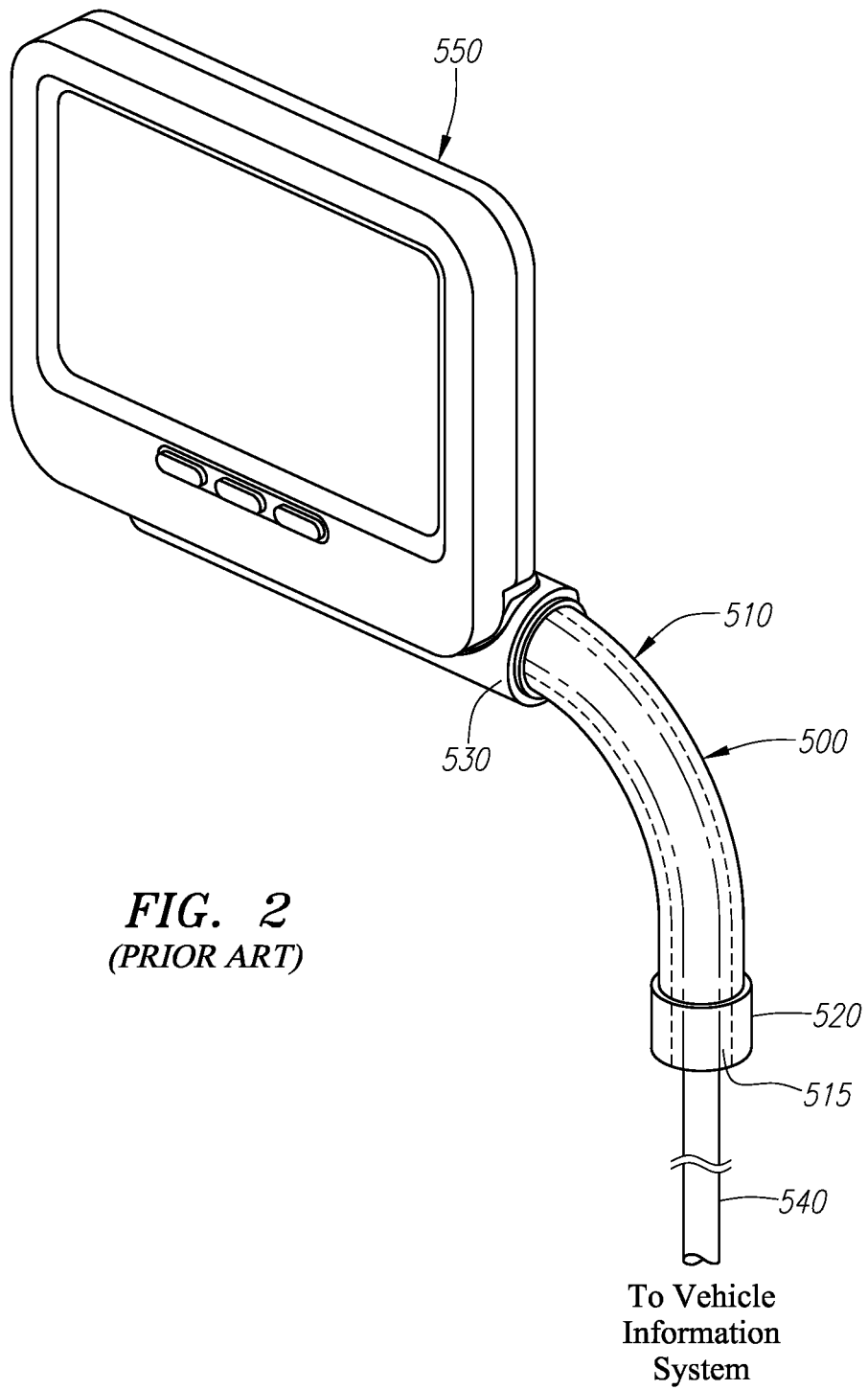
FIG. 2 shows a detail drawing of the prior art support arm of FIG. 1A, wherein the support arm includes an internal channel for receiving a video cable and a plurality of rotatable joints.

If the user interface device 200 and the content source 310 communicate via the communication cable assembly 700, the communication cable assembly 700 can have a dimension (such as a diameter, cross-section, thickness, and/or width) that is greater than the dimension of conventional video communication cables 540 (shown in FIG. 2). In contrast to the conventional support arms 500 with shapes that do not allow for communication cables 710 with larger dimensions, the deployment system 100 advantageously forms an internal channel (not shown) with a dimension (such as a diameter, cross-section, thickness, bore, width, and/or bend radii) that is sufficient for receiving the communication cable 710. Stated somewhat differently, one or more of the main rotating joint system 110, the device mounting assembly 120, and/or the extension support system 130 of the deployment system 100 can define an internal channel with a dimension that is greater than the dimension of internal channels within conventional support arms 500 (shown in FIG. 2) and compatible with cable sizes, such as diameters and/or minimum bend radii, suitable for use with state-of-the-art systems.

Despite space limitations that can exist in selected operating environments, such as within a passenger seat 440 (shown in FIGS. 13A-B) disposed aboard a passenger vehicle 400 (shown in FIGS. 13A-B), the internal channel preferably has a dimension that permits the communication cable 710 to float within the deployment system 100. In other words, physical contact between the communication cable 710 and one or more internal surfaces of the deployment system 100 that define the internal channel can be minimized because the dimension of the internal channel provides the internal channel with sufficient space for accommodating the dimension of the communication cable 710. Any twisting of the communication cable 710 due to rotation of the main rotating joint system 110, such as at the coupling of the main rotating joint system 110 (and/or the device mounting assembly 120) with the extension support system 130, thereby can be distributed along the communication cable 710, rather than within a short twist length (and/or section).

Alternatively, and/or additionally, the coupling of the main rotating joint system 110 (and/or the device mounting assembly 120) with the extension support system 130 can include large bend radii for facilitating installation of the communication cable 710 and/or for further distributing any twisting along the communication cable 710. The large bend radii can enable the internal channel adjacent to the main rotating joint system 110 to have a dimension that permits the communication cable 710 to float within the deployment system 100 in the manner discussed above. The deployment system 100 thereby enables each passenger seat 440 within a passenger compartment 430 (shown in FIGS. 13A-B) of a passenger vehicle 400 to include a user interface device 200 for communicating with the content source 310.

Figure 1B:
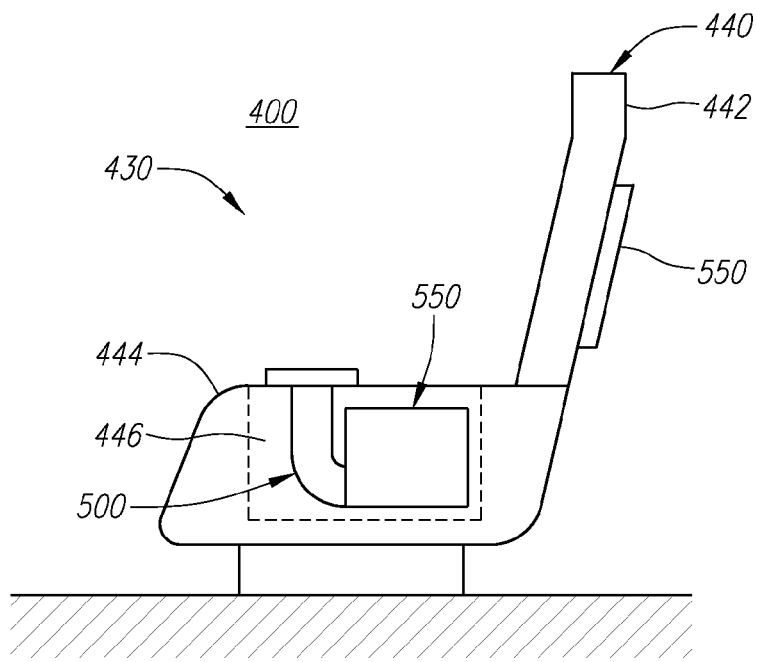
FIG. 1B shows the prior art support arm of FIG. 1A, wherein the video display system is illustrated in a stowed position.

Further, although the weight of the user interface device 200 may be greater than the weight of conventional video display systems 550 (shown in FIGS. 1A-B), the deployment system 100 is configured to support the user interface device 200. The main rotating joint system 110 of the deployment system 100 advantageously includes a progressive clutch system for holding the user interface device 200 in the deployed position, regardless of the selected viewing angle, but without requiring excessive force to be applied to the deployment system 100 for returning the user interface device 200 to the stowed position. Stated somewhat differently, a force exerted by the clutch system progressively decreases as the user interface device 200 is moved to the stowed position.

Figure 4A:
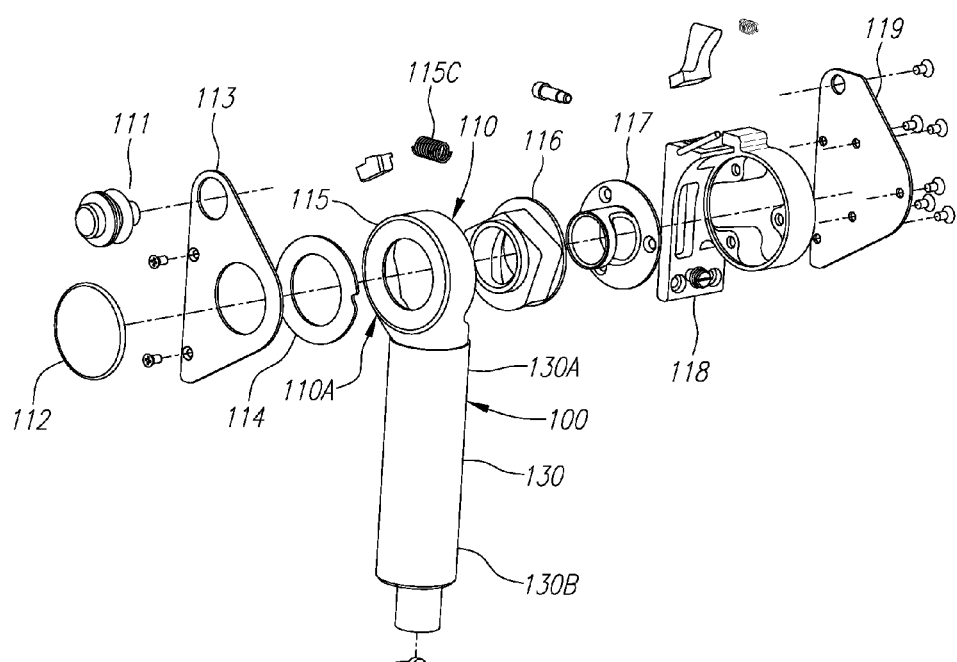
FIG. 4A is an exemplary top-level drawing illustrating an exploded view of embodiment of a main rotating joint system for the deployment system of FIG. 3.
Figure 4A:
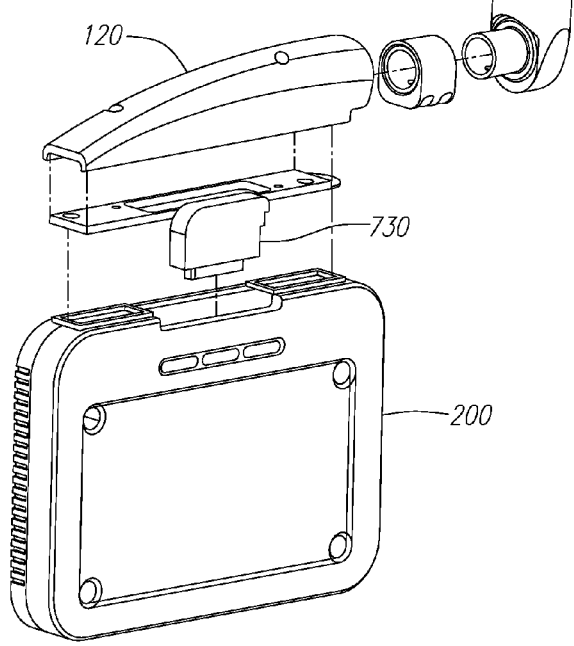
Figure 4B:
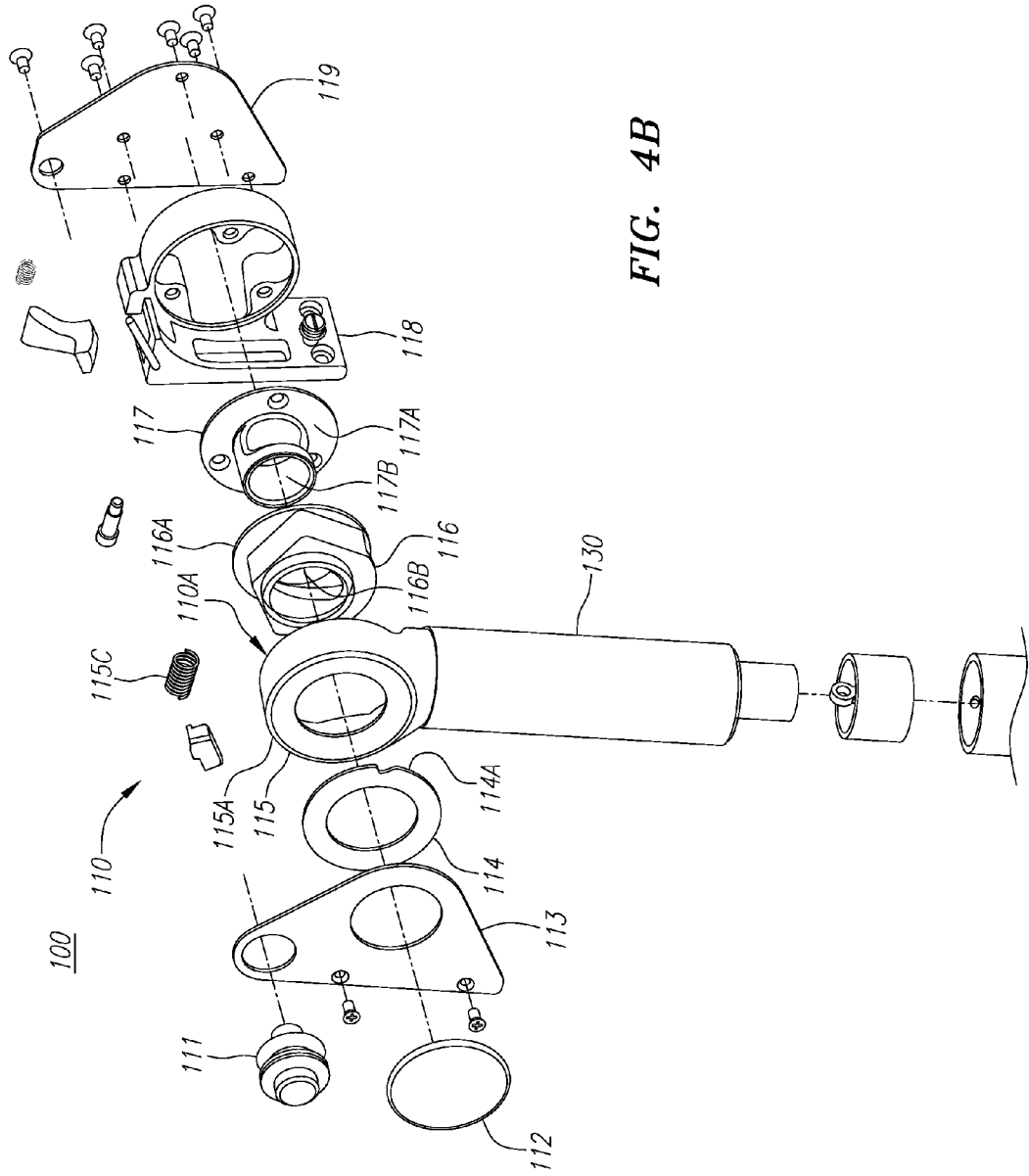
FIG. 4B is a detail drawing illustrating an exploded view of an embodiment of the main rotating joint system of FIG. 4A.

An exploded view of one embodiment of the deployment system 100 is illustrated in FIGS. 4A-B. Turning to FIG. 4B, the deployment system 100 is shown for readily accommodating a communication cable 710 (shown in FIG. 3) having a cable width (or cross-section) between five hundred mils (0.50 inches) and six hundred and fifty mils (0.65 inches) or more. The main rotating joint system 110 preferably includes a main (or progressive) clutch system 110A that comprises an auxiliary main clutch disk system 114, a main clutch pivot house system 115, a main clutch insert system 116, and/or a main clutch shaft system 117.

In one embodiment, the auxiliary main clutch disk system 114 and the main clutch pivot house system 115 provide respective ramped, cylindrical, and/or stepped contact surfaces 114A, 115A, wherein the contact surface 114A of the auxiliary main clutch disk system 114 and the contact surface 115A of the main clutch pivot house system 115 communicate (or cooperate). The communication between the contact surface 114A and the contact surface 115A thereby enables the auxiliary main clutch disk system 114 and the main clutch pivot house system 115 to provide ramped (and/or cylindrical and/or stepped) mechanical resistance for the main clutch system 110A as the deployment system 100 deploys. In other words, as the auxiliary main clutch disk system 114 rotates relative to the main clutch pivot house system 115 as the deployment system 100 deploys, an amount of cooperation between the contact surface 114A and the contact surface 115A can be ramped (and/or cylindrical and/or stepped) up. Similarly, the amount of cooperation between the contact surface 114A and the contact surface 115A can be ramped (and/or cylindrical and/or stepped) down as the deployment system 100 is returned to the stowed position.

In one embodiment, the mechanical resistance between the contact surface 114A and the contact surface 115A can comprise (only) friction for resisting motion. Stated somewhat differently, the deployment system 100 of this embodiment can be provided as a dry deployment system. Such a deployment system 100 therefore does not require any internal fluids and/or seals for preventing the internal fluids from leaking. The deployment system 100 advantageously is less complicated, and requires less maintenance, than conventional support arms 500 (shown in FIGS. 1A-B).

Alternatively, and/or additionally, the main clutch insert system 116 can provide a ramped, cylindrical, and/or stepped contact surface 116A; whereas, the main clutch shaft system 117 can provide a ramped, cylindrical, and/or stepped contact surface 117A. The contact surface 116A of the main clutch insert system 116 can be positioned to communicate (or cooperate) with the contact surface 117A of the main clutch shaft system 117. The communication between the contact surface 116A and the contact surface 117A enables the main clutch insert system 116 and the main clutch shaft system 117 to provide ramped (and/or cylindrical and/or stepped) friction for the main clutch system 110A as the deployment system 100 deploys. Stated somewhat differently, as the main clutch insert system 116 rotates relative to the main clutch shaft system 117 as the deployment system 100 deploys, an amount of cooperation between the contact surface 116A and the contact surface 117A can be ramped (and/or cylindrical and/or stepped) up. The amount of cooperation between the contact surface 116A and the contact surface 117A likewise can be ramped (and/or cylindrical and/or stepped) down as the deployment system 100 is returned to the stowed position.

Preferably, the communication between the contact surfaces 116A, 117A provides primary friction to the clutch assembly during deployment of the deployment system 100; whereas, the communication between the contact surfaces 114A, 115A provides secondary friction to the clutch assembly during deployment. Advantageously, the construction of the main clutch system 110A enables the deployment system 100 to be released from the stowed position and to maintain approximately constant tension throughout deployment travel. The main clutch system 110A thereby inhibits the deployment system 100 from falling in intermediate deployment positions, preventing potential injuries to users and damage to the user interface device 200 (shown in FIG. 3). These advantages become even more significant as the weight of the user interface device 200 increases.

The main clutch insert system 116 and the main clutch shaft system 117 likewise can form respective internal channels 116B, 117B each having predetermined dimensions. When the deployment system 100 is properly assembled, the internal channels 116B, 117B can cooperate, and have suitable predetermined dimensions, for receiving the communication cable 710. The main clutch insert system 116 preferably are formed from an acetal resin, nylon, or other thermoplastic material, such as Delrin® as manufactured by E.I. du Pont de Nemours and Company of Wilmington, Del. As desired, the internal channel 117B of the main clutch shaft system 117 can be internally threaded for adjusting a nut clamping for the deployment system 100.

FIGS. 4A-B illustrate that the deployment system 100 likewise can include a release pushbutton assembly 111, a main clutch adjustment nut assembly 112, an inner side plate assembly 113, a mounting bracket 118, and/or an outside plate assembly 119. The release pushbutton assembly 111 enables the deployment system 100 to be released from the stowed position and deployed. The main clutch adjustment nut assembly 112 can cooperate with the internal channel 117B of the main clutch shaft system 117 to provide axial compression for the clutch assembly of the deployment system 100. The mounting bracket 118 can secure the deployment system 100 to the installation location and engages the main clutch shaft system 117.

Figure 5:
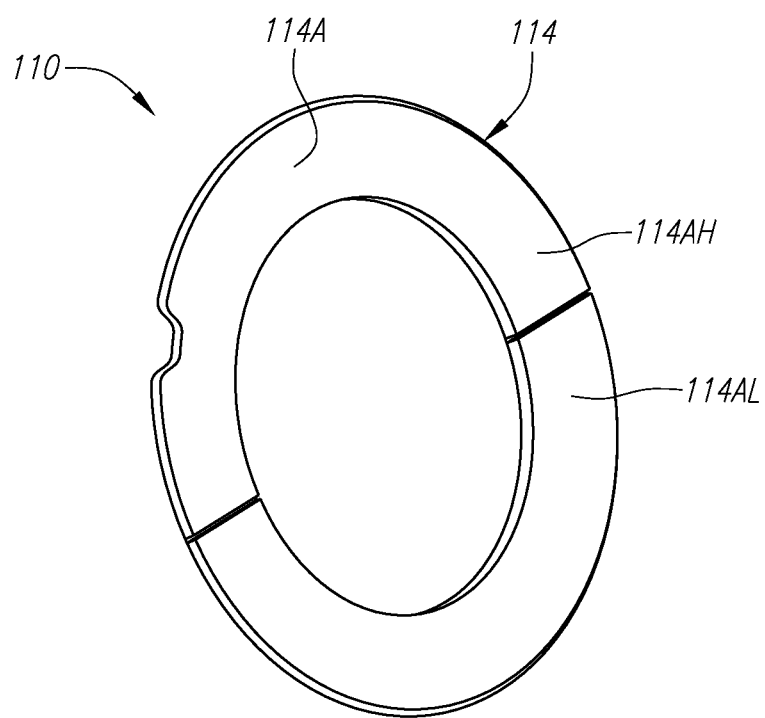
FIG. 5 is a detail drawing illustrating an embodiment of an auxiliary main clutch disk system for the main rotating joint system of FIGS. 4A-B.

FIGS. 5-8 respectively illustrate of one embodiment of the auxiliary main clutch disk system 114, the main clutch pivot house system 115, the main clutch insert system 116, and the main clutch shaft system 117. Turning to FIG. 5, for example, the auxiliary main clutch disk system 114 is shown, wherein the auxiliary main clutch disk system 114 includes the ramped, cylindrical, and/or stepped contact surface 114A. The contact surface 114A of FIG. 5 includes a "high" contact surface 114AH and a "low" contact surface 114AL. In other words, each high contact surface 114AH extends at a greater distance from the contact surface 114A than the corresponding low contact surface 114AL extends from the contact surface 114A. The distance by which the high contact surface 114AH extends from the low contact surface 114AL can comprise any suitable distance. In one preferred embodiment, the high contact surface 114AH extends from the low contact surface 114AL by a distance between about two mils (0.002") and four mils (0.004").

The contact surface 114A can have more than one high contact surface 114AH and/or more than one low contact surface 114AL as desired. The high contact surface 114AH likewise can extend from the contact surface 114A in a uniform and/or variable manner. Stated somewhat differently, the high contact surface 114AH can extend from the contact surface 114A by a fixed distance (such as a step) and/or a variable distance (such as a ramp and/or a plurality of steps). Although the high contact surface 114AH is illustrated in FIG. 5 as comprising approximately one-half of the contact surface 114A of the auxiliary main clutch disk system 114 for purposes of illustration only, the high contact surface 114AH and the low contact surface 114AL can distributed over the contact surface 114A in any suitable ratio as desired. Exemplary ratios of the high contact surface 114AH to the low contact surface 114AL can include 70/30, 60/40, 55/45, 45/55, 40/60, 30/70 or any other suitable ratio between 90/10 and 10/90 or more.

Figure 6:
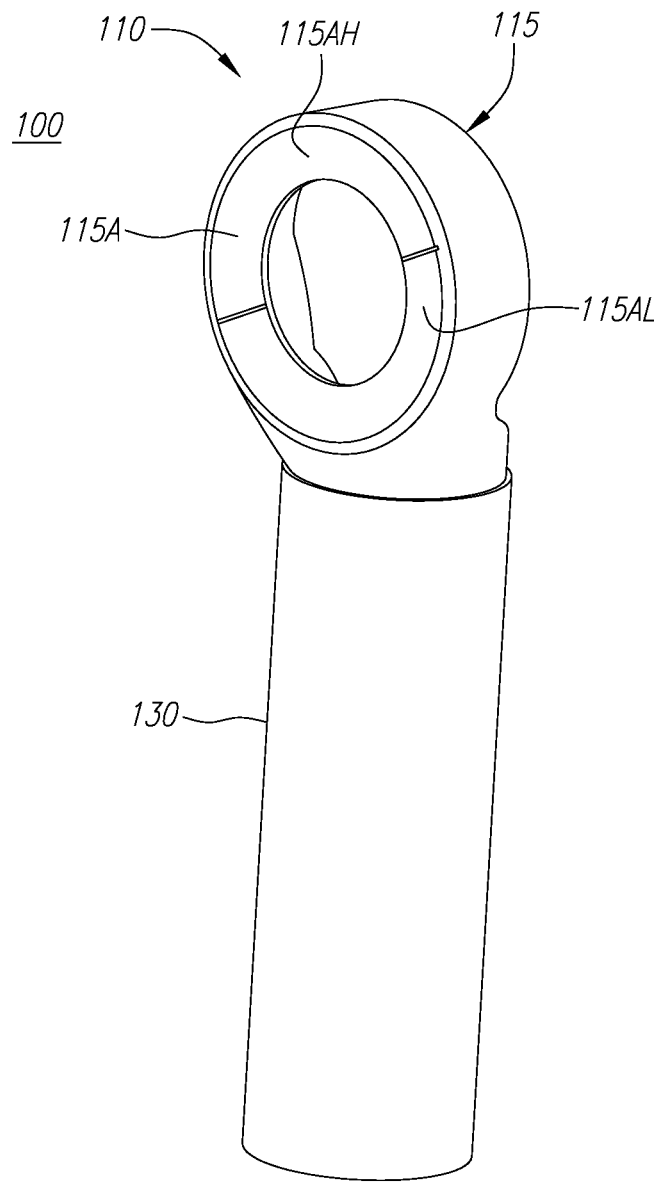
FIG. 6 is a detail drawing illustrating an embodiment of a main clutch pivot house system for the main rotating joint system of FIGS. 4A-B.

One embodiment of the main clutch pivot house system 115 is illustrated in FIG. 6. In the manner discussed above with reference to the auxiliary main clutch disk system 114 of FIG. 5, the main clutch pivot house system 115 of FIG. 6 includes a contact surface 115A with a "high" contact surface 115AH and a "low" contact surface 115AL. In other words, each high contact surface 115AH extends at a greater distance from the contact surface 115A than the corresponding low contact surface 115AL extends from the contact surface 115A. The distance by which the high contact surface 115AH extends from the low contact surface 115AL can comprise any suitable distance, such as a distance between 0.5 mils (0.0005") and ten mils (0.010") or more. In one preferred embodiment, the high contact surface 115AH extends from the low contact surface 115AL by a distance between about two mils (0.002") and four mils (0.004").

The contact surface 115A can have more than one high contact surface 115AH and/or more than one low contact surface 115AL as desired. The high contact surface 115AH likewise can extend from the contact surface 115A in a uniform and/or variable manner. Stated somewhat differently, the high contact surface 115AH can extend from the contact surface 115A by a fixed distance (such as a step) and/or a variable distance (such as a ramp and/or a plurality of steps). Although illustrated in FIG. 6 as comprising approximately one-half of the contact surface 115A of the main clutch pivot house system 115 for purposes of illustration only, the high contact surface 115AH and the low contact surface 115AL can distributed over the contact surface 115A in any suitable ratio. The ratio of the high contact surface 115AH to the low contact surface 115AL can be provided in the same manner set forth in more detail above with reference to the ratio of the high contact surface 114AH (shown in FIG. 5) to the low contact surface 114AL (shown in FIG. 5). As desired, the ratio of the high contact surface 115AH to the low contact surface 115AL can be the same as and/or different from the ratio of the high contact surface 114AH to the low contact surface 114AL.

Operation of the main clutch system 110A is described with reference to FIGS. 4A-B, 5, and 6. The auxiliary main clutch disk system 114 and the main clutch pivot house system 115 are illustrated as being disposed on a common axis and/or rotatable about the common axis. When the deployment system 100 is in the stowed position, the high contact surface 115AH of the main clutch pivot house system 115 is aligned with the low contact surface 114AL of the auxiliary main clutch disk system 114. In this alignment between the main clutch pivot house system 115 and the auxiliary main clutch disk system 114, no axial compression is applied by the main clutch system 110A and the extension support system 130 can rotate freely about the main rotating joint system 110 for a few degrees of rotational travel.

As the extension support system 130 rotates from the stowed position, the main clutch pivot house system 115 begins to rotate relative to the auxiliary main clutch disk system 114. In one embodiment, the auxiliary main clutch disk system 114 can be held stationary as the main clutch pivot house system 115 rotates with the extension support system 130. The high contact surface 115AH of the main clutch pivot house system 115 thereby begins to contact (and/or engage) the high contact surface 114AH of the auxiliary main clutch disk system 114. The engagement between the high contact surfaces 114AH, 115AH creates an axial friction force between the main clutch pivot house system 115 and the auxiliary main clutch disk system 114. As the extension support system 130 continues to rotate relative to the main rotating joint system 110 toward the deployed position, the high contact surfaces 114AH, 115AH progressively contact (and/or engage), and the resultant axial compression escalates. The axial compression, in turn, causes a mechanical resistance against free rotation of the extension support system 130 relative to the main rotating joint system 110.

In a fully-deployed position (a rotational position that is furthest from the stowed position) of the extension support system 130, the axial compression reaches its maximum compression level. The anti-rotational clutch force thereby is maximized in the fully-deployed position. The main clutch pivot house system 115 is shown in FIGS. 4A-B as including an optional retarding system 115C, such as a spring, that provides additional tension relative to standard springs in conventional support arms 500 (shown in FIGS. 1A-B) and also helps to prevent (and/or inhibit) the deployment system 100 from allowing the user interface devices 200 to drop too quickly, which can result in injuries to a device user.

Figure 7:
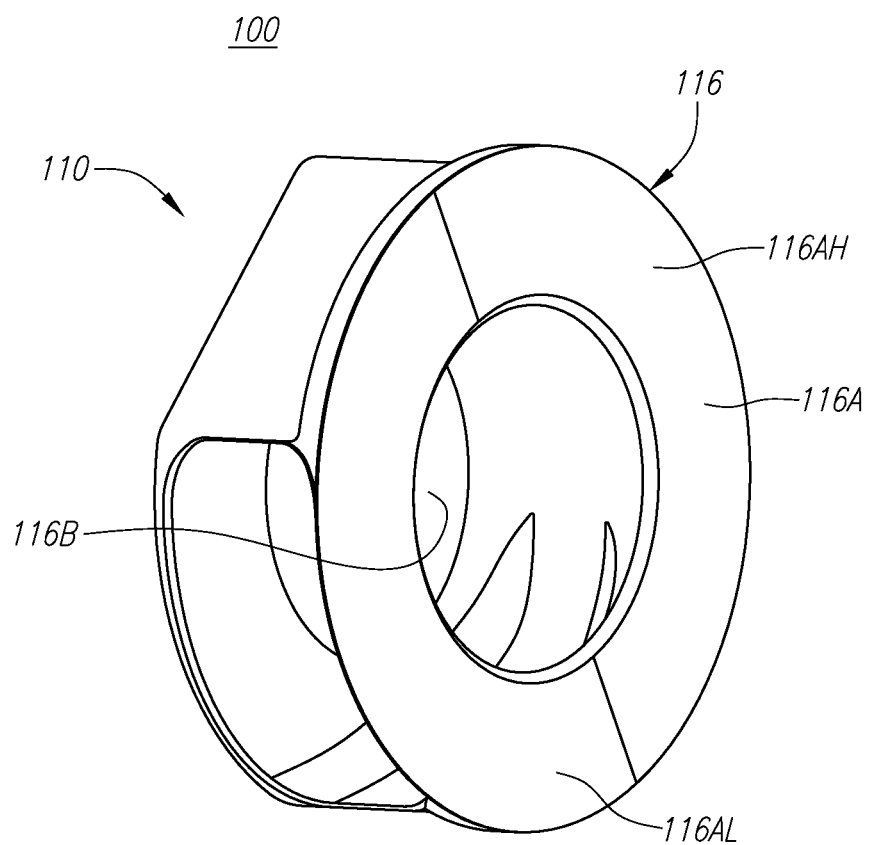
FIG. 7 is a detail drawing illustrating an embodiment of a main clutch insert system for the main rotating joint system of FIGS. 4A-B.

Turning to FIG. 7, the main clutch insert system 116 is shown as including the ramped, cylindrical, and/or stepped contact surface 116A. In the manner discussed in more detail above with reference to the contact surfaces 114A, 115A (shown in FIGS. 5 and 6), the contact surface 116A of FIG. 7 includes a "high" contact surface 116AH and a "low" contact surface 116AL. In other words, each high contact surface 116AH extends at a greater distance from the contact surface 116A than the corresponding low contact surface 116AL extends from the contact surface 116A. The distance by which the high contact surface 116AH extends from the low contact surface 116AL can be provided in the manner discussed in more detail above with reference to the distance by which the high contact surface 115AH extends from the low contact surface 115AL.

For example, the distance by which the high contact surface 116AH extends from the low contact surface 116AL can comprise any suitable distance, such as a distance between 0.5 mils (0.0005") and ten mils (0.010") or more. In one preferred embodiment, the high contact surface 116AH (shown in FIG. 7) extends from the low contact surface 116AL (shown in FIG. 7) by a distance between about two mils (0.002") and four mils (0.004"). As desired, the distance by which the high contact surface 116AH extends from the low contact surface 116AL can be the same as and/or different from the distance by which the high contact surface 115AH extends from the low contact surface 115AL.

The contact surface 116A can have more than one high contact surface 116AH and/or more than one low contact surface 116AL as desired. The high contact surface 116AH likewise can extend from the contact surface 116A in a uniform and/or variable manner. Stated somewhat differently, the high contact surface 116AH can extend from the contact surface 116A by a fixed distance (such as a step) and/or a variable distance (such as a ramp and/or a plurality of steps). Although illustrated in FIG. 7 as comprising approximately one-half of the contact surface 116A of the main clutch insert system 116 for purposes of illustration only, the high contact surface 116AH and the low contact surface 116AL can distributed over the contact surface 116A in any suitable ratio.

The ratio of the high contact surface 116AH and the low contact surface 116AL can be provided in the same manner set forth in more detail above with reference to the ratio of the high contact surface 114AH (shown in FIG. 5) to the low contact surface 114AL (shown in FIG. 5). As desired, the ratio of the high contact surface 116AH and the low contact surface 116AL can be the same as and/or different from the ratio of the high contact surface 114AH to the low contact surface 114AL.

Figure 8:
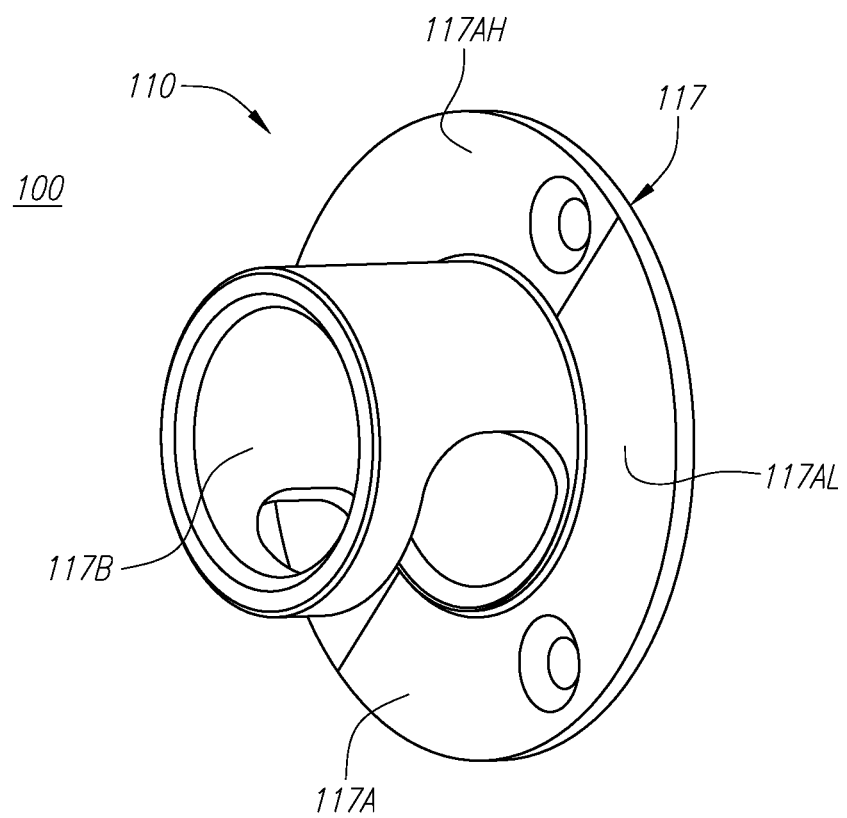
FIG. 8 is a detail drawing illustrating an embodiment of a main clutch shaft system for the main rotating joint system of FIGS. 4A-B.

One embodiment of the main clutch shaft system 117 is illustrated in FIG. 8. In the manner discussed above with reference to the main clutch insert system 115 of FIG. 6, the main clutch shaft system 117 of FIG. 8 includes a contact surface 117A with a "high" contact surface 117AH and a "low" contact surface 117AL. In other words, each high contact surface 117AH extends at a greater distance from the contact surface 117A than the corresponding low contact surface 117AL extends from the contact surface 117A. The distance by which the high contact surface 117AH extends from the low contact surface 117AL can comprise any suitable distance, such as a distance between 0.5 mils (0.0005") and ten mils (0.010") or more. In one preferred embodiment, the high contact surface 117AH extends from the low contact surface 117AL by a distance between about two mils (0.002") and four mils (0.004"). As desired, the distance by which the high contact surface 117AH extends from the low contact surface 117AL can be the same as and/or different from the distance by which the high contact surface 115AH extends from the low contact surface 115AL.

The contact surface 117A can have more than one high contact surface 117AH and/or more than one low contact surface 117AL as desired. The high contact surface 117AH likewise can extend from the contact surface 117A in a uniform and/or variable manner. Stated somewhat differently, the high contact surface 117AH can extend from the contact surface 117A by a fixed distance (such as a step) and/or a variable distance (such as a ramp and/or a plurality of steps). Although illustrated in FIG. 8 as comprising approximately one-half of the contact surface 117A of the main clutch shaft system 117 for purposes of illustration only, the high contact surface 117AH and the low contact surface 117AL can distributed over the contact surface 117A in any suitable ratio. The ratio of the high contact surface 117AH and the low contact surface 117AL can be provided in the same manner set forth in more detail above with reference to the ratio of the high contact surface 114AH (shown in FIG. 5) to the low contact surface 114AL (shown in FIG. 5). As desired, the ratio of the high contact surface 117AH and the low contact surface 117AL can be the same as and/or different from the ratio of the high contact surface 114AH to the low contact surface 114AL.

Operation of the main clutch system 110A is described with reference to FIGS. 4A-B, 7, and 8. The main clutch insert system 116 and the main clutch shaft system 117 are illustrated as being disposed on a common axis and/or rotatable about the common axis. In one embodiment, the main clutch insert system 116 and the main clutch shaft system 117 are provided on the common axis of the auxiliary main clutch disk system 114 and the main clutch pivot house system 115. When the deployment system 100 is in the stowed position, the high contact surface 117AH of the main clutch shaft system 117 is aligned with the low contact surface 116AL of the main clutch insert system 116. In this alignment between the main clutch shaft system 117 and the main clutch insert system 116, no axial compression is applied by the main clutch system 110A. The extension support system 130 thereby can rotate freely about the main rotating joint system 110 for a few degrees of rotational travel.

As the extension support system 130 rotates from the stowed position, the main clutch insert system 116 begins to rotate relative to the main clutch shaft system 117. In one embodiment, the main clutch shaft system 117 can be held stationary as the main clutch insert system 116 rotates with the extension support system 130. The high contact surface 117AH of the main clutch shaft system 117 thereby begins to contact (and/or engage) the high contact surface 116AH of the main clutch insert system 116. The engagement between the high contact surfaces 116AH, 117AH creates an axial friction force between the main clutch shaft system 117 and the main clutch insert system 116. As the extension support system 130 continues to rotate relative to the main rotating joint system 110 toward the deployed position, the high contact surfaces 116AH, 117AH progressively contact (and/or engage), and the axial compression escalates. The axial compression, in turn, causes a mechanical resistance against free rotation of the extension support system 130 relative to the main rotating joint system 110. In the fully-deployed position, the axial compression reaches its maximum compression level. The anti-rotational clutch force thereby is maximized in the fully-deployed position.

Advantageously, the main clutch system 110A can apply the progressive axial compression generated by the interaction between the high contact surfaces 114AH, 115AH and/or the progressive axial compression generated by the interaction between the high contact surfaces 116AH, 117AH to provide the mechanical resistance against free rotation of the extension support system 130 relative to the main rotating joint system 110. The deployment system 100 thereby can generate more anti-rotational clutch force than is available from conventional support arms 500 (shown in FIGS. 1A-B). Thereby, the deployment system 100 can support heavier user interface devices 200 (shown in FIG. 3) and can inhibit the user interface device 200 from dropping too quickly, which can result in injuries to the device user.

Figure 9:
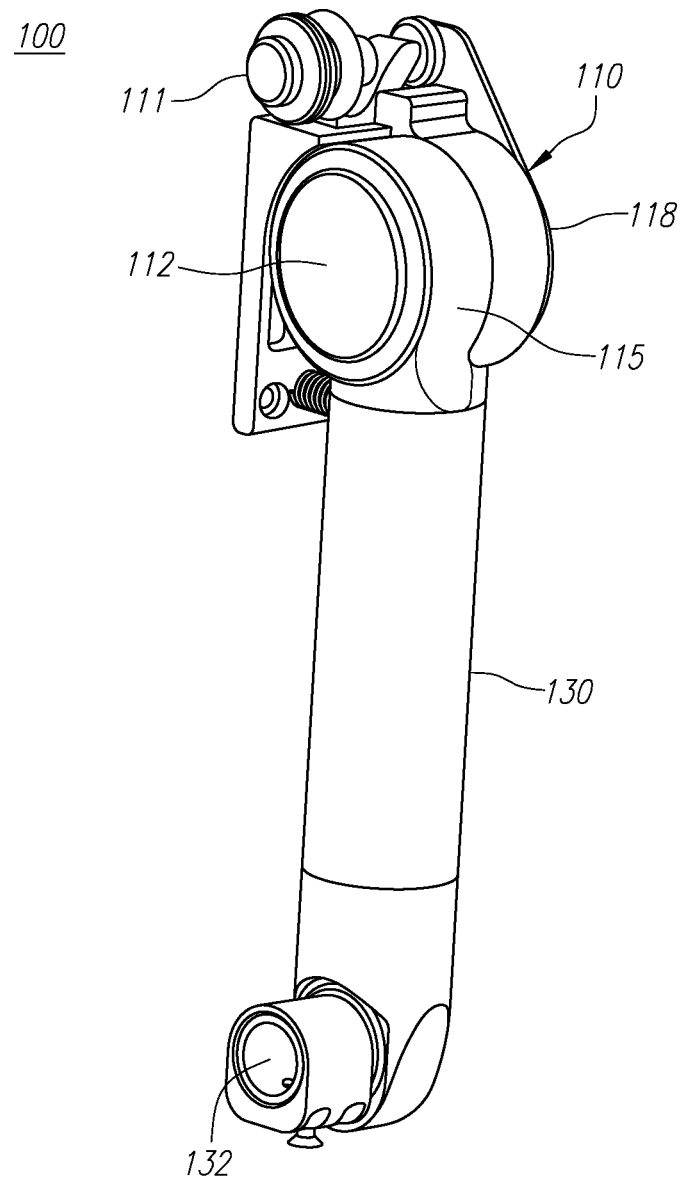
FIG. 9 is a detail drawing illustrating an embodiment of an extension support system for the deployment system of FIG. 3.

Turning to FIG. 9, an embodiment of the extension support system 130 for the deployment system 100 is shown. The extension support system 130 is illustrated as forming a large bore clutch shaft 130 for communicating with the device mounting assembly 120 (shown in FIG. 3). In the manner set forth above, the large bore clutch shaft 130 has a dimension (and/or bore or cross-section) for accommodating the communication cable 710 (shown in FIG. 3). Despite space limitations that can exist in selected operating environments, such as within a passenger seat 440 (shown in FIGS. 13A-B) disposed aboard a passenger vehicle 400 (shown in FIGS. 13A-B), the large bore clutch shaft 130 preferably has a dimension that permits the communication cable 710 to float within the deployment system 100. In other words, physical contact between the communication cable 710 and one or more internal surfaces of the deployment system 100 that define the internal channel can be minimized. Any twisting of the communication cable 710 due to rotation of the main rotating joint system 110, such as at the coupling of the main rotating joint system 110 (and/or the device mounting assembly 120) with the extension support system 130, thereby can be distributed along the communication cable 710, rather than within a short twist length (and/or section).

Alternatively, and/or additionally, the coupling of the device mounting assembly 120 with the extension support system 130 is shown as including large bend radii for facilitating installation of the communication cable 710 and/or for further distributing any twisting along a preselected length (and/or section) of the communication cable 710. The large bend radii can enable the internal channel adjacent to the main rotating joint system 110 to have a dimension that permits the communication cable 710 to float within the deployment system 100 in the manner discussed above. The deployment system 100 thereby enables each passenger seat 440 within a passenger compartment 430 (shown in FIGS. 13A-B) of a passenger vehicle 400 to include a user interface device 200 for communicating with the content source 310.

Figure 10A:
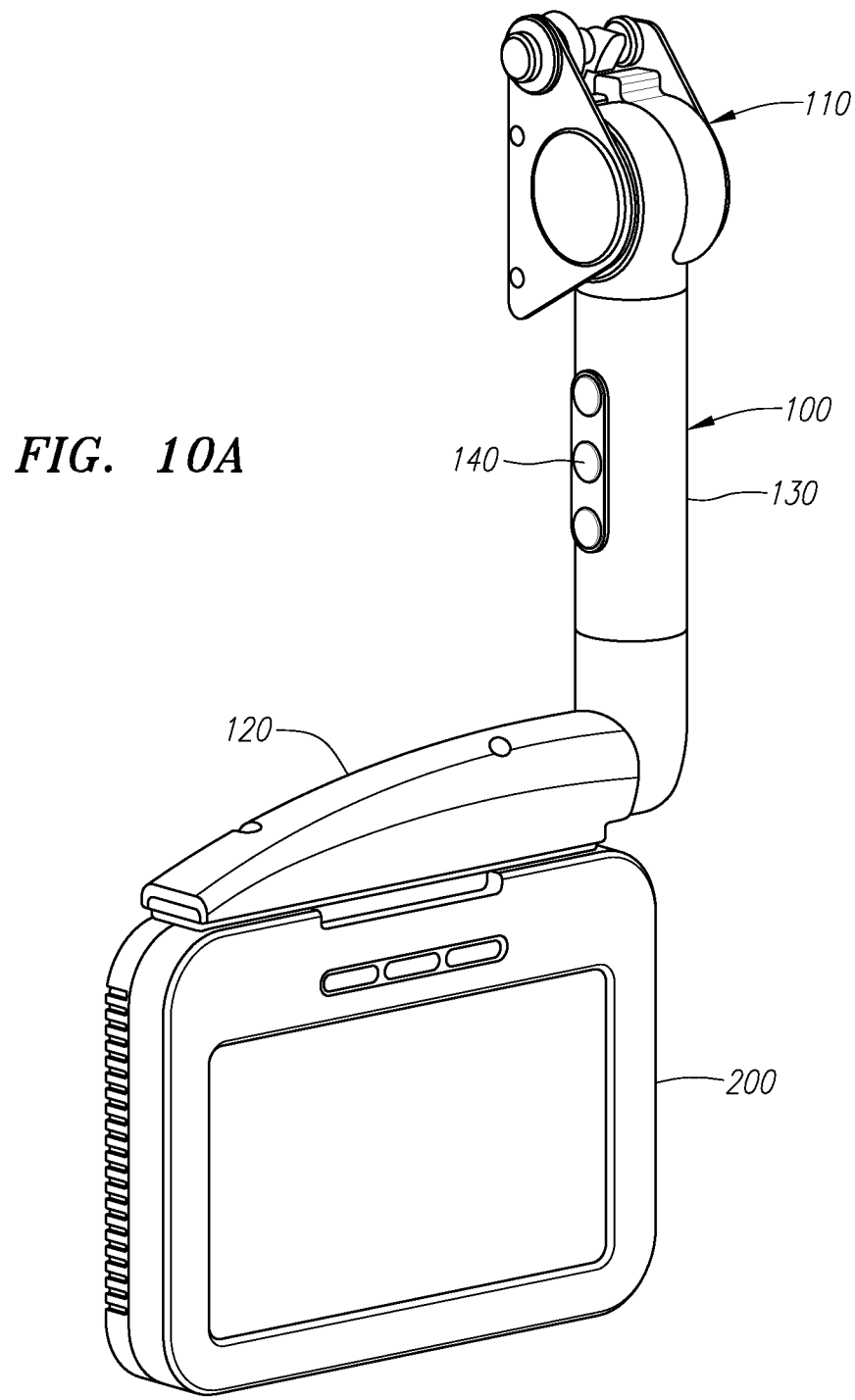
FIG. 10A is an exemplary top-level drawing illustrating an alternative embodiment of the deployment system of FIG. 3, wherein the deployment system further supports one or more peripheral devices and/or user input systems.
Figure 10B:
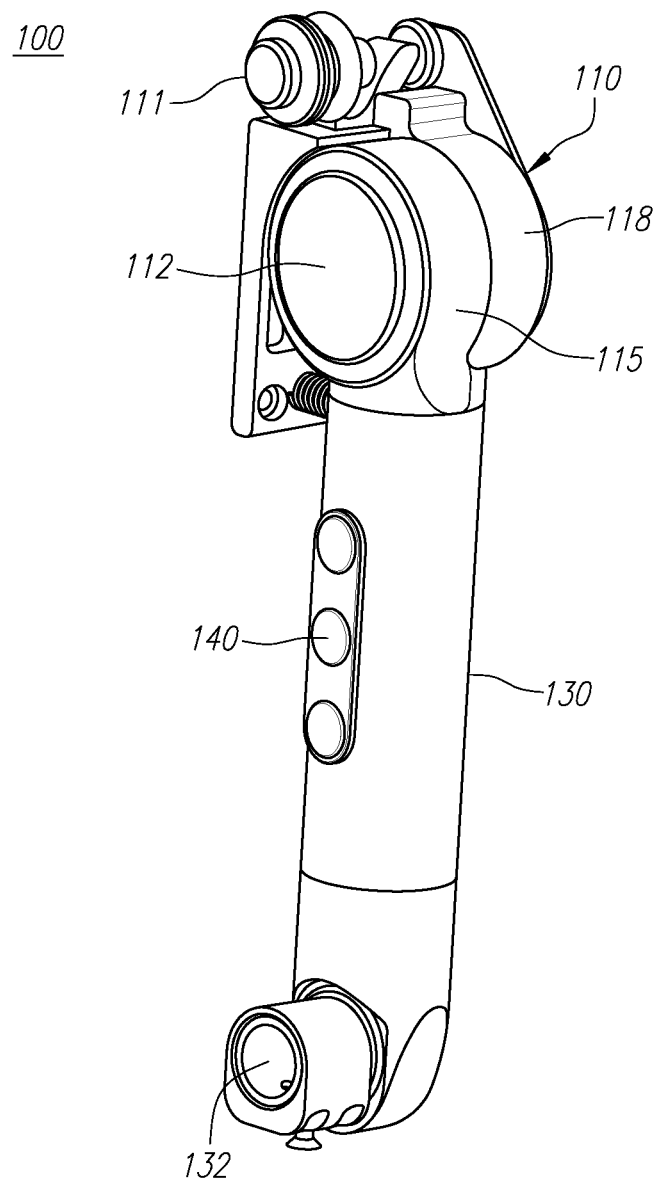
FIG. 10B is a detail drawing illustrating an embodiment of an extension support system for the deployment system of FIG. 10A.

Another preferred embodiment of the deployment system 100 is illustrated in FIGS. 10A-B. The deployment system 100 can include an optional interface system 140 for accommodating conventional peripheral devices (not shown) and/or providing a user input system. The interface system 140 can be provided at any suitable location on the deployment system 100 and is shown as being provided on the extension support system 130 for purposes of illustration and not for purposes of limitation. The interface system 140, for example, can include one or more conventional communication connectors (or ports) for coupling with a personal media device, a headphone (or speaker) system, a Universal Serial Bus (USB) device, and/or any other conventional type of peripheral device.

The user input system provided by the interface system 140 can be provided in any conventional manner and, in one embodiment, can include one or more switches (or pushbuttons), such as a keyboard or a keypad, and/or a pointing device, such as a mouse, trackball, or stylus. The user input system, for example, can include a membrane switch for providing audio volume level control and/or channel control. Thereby, additional user functions, if not all user functions, can be integrated into the deployment system 100. In a transportation environment, for instance, user functions advantageously can be removed from the armrest 444 (shown in FIGS. 13A-B) of the passenger seat 440 (shown in FIGS. 13A-B) and incorporated into (or integrated with) the deployment system 100. The deployment system 100 thereby can enable simpler and/or more compact incorporation of additional features, functions, connectivity, and/or control for the user.

The deployment system 100 can be provided with any suitable ornamental appearance. One or more selected components 110, 120, 130, 140 of the deployment system 100, for example, can be anodized, provided with a snap-on cover, coated with a decorative film, covered with leather, and/or painted. The deployment system 100 thereby can be provided with any desired customized decorative finish. Advantageously, the snap-on cover can be readily replaced if a vehicle operator changes color schemes, if the vehicle is sold, and/or if the cover becomes damaged.

Although the deployment system 100 may be used in conjunction with information systems that are disposed in fixed locations, such as buildings, the deployment system 100 likewise can advantageously be applied in portable system applications. Turning to FIGS. 11A-B, for example, the deployment system 100 can be applied in a vehicle information system 300 that can be configured for installation aboard a wide variety of passenger vehicles 400. Exemplary types of passenger vehicles can include an automobile 410 (shown in FIG. 11A), an aircraft 420 (shown in FIG. 11B), a bus, a recreational vehicle, a boat, and/or a locomotive (or train), without limitation. If installed on an aircraft 420 as illustrated in FIG. 11B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 11A-B, the vehicle information system 300 can distribute and present viewing content available from one or more content sources 310. Each content source 310 can be provided in any conventional manner, including in the manner set forth in the above-referenced co-pending U.S. patent applications, "SYSTEM AND METHOD FOR DOWNLOADING FILES," Ser. No. 10/772,565, filed on Feb. 4, 2004; and "PORTABLE MEDIA DEVICE AND METHOD FOR PRESENTING VIEWING CONTENT DURING TRAVEL," Ser. No. 11/154,749, filed on Jun. 15, 2005, as well as in the co-pending U.S. patent applications, entitled "SYSTEM AND METHOD FOR MANAGING CONTENT ON MOBILE PLATFORMS," Ser. No. 11/123, 327, filed on May 6, 2005; and entitled "SYSTEM AND METHOD FOR RECEIVING BROADCAST CONTENT ON A MOBILE PLATFORM DURING INTERNATIONAL TRAVEL," Ser. No. 11/269,378, which applications were incorporated herein by reference above. The vehicle information system 300 likewise can receive viewing content from, and/or provide viewing content to, another content source (not shown). In other words, the selected content source 310 can be configured to operate as an intermediate (or relay) system in a larger communication system that includes one or more other content sources 310.

The vehicle information system 300 can include at least one internal content source 310, such as a media server system 312, that is installed aboard the vehicle 400 and/or at least one remote content source 314 that can be external from the vehicle 400. Being disposed at a headend of the vehicle information system 300, the media server system 312 can provide overall system control functions for the vehicle information systems 300 and/or at least one media (or file) server system for storing preprogrammed content and/or the received viewing content, as desired. The media server system 312 can include, and/or communicate with, one or more conventional peripheral media storage systems (not shown). Exemplary peripheral media storage systems can include optical media devices, such as a digital video disk (DVD) system and/or a compact disk (CD) system, and or magnetic media systems, such as a video cassette recorder (VCR) system and/or a hard disk drive (HDD) system, of any suitable kind, for storing preprogrammed content and/or the received viewing content.

The vehicle information system 300 can communicate with the content sources 310 in any conventional manner, including via wired and/or wireless communications. As shown in FIG. 11B, for example, the vehicle information system 300 can include an antenna system 340 and a transceiver system 350 for communicating with the remote content source 314. The antenna system 340 preferably is disposed outside the vehicle 400, such as on an exterior surface 424 of a fuselage 422 of the aircraft 420. The vehicle information system 300 and the remote content source 314 therefore can communicate in any conventional wireless manner, including directly and/or indirectly via an intermediate communication system 500, such as a satellite communication system 511. As desired, the remote content source 314 can be configured to communicate with other terrestrial content sources (not shown). The remote content source 314 is shown in FIG. 11B as providing access to the Internet 316. Although shown and described as comprising the satellite communication system 511 for purposes of illustration, it is understood that the communication system 501 can comprise any conventional type of wireless communication system, such as a cellular communication system (not shown) and/or an Aircraft Ground Information System (AGIS) communication system (not shown).

One or more seat interface systems 330 are provided for enabling passengers to interact with the vehicle information system 300 during travel. Although the seat interface systems 330 can comprise conventional passenger seat interface systems, the seat interface systems 330 preferably include at least one user interface device 200 provided in the manner discussed above. The antenna system 340 and the transceiver system 350 of the vehicle information system 300 is illustrated in FIG. 11B as communicating with the media server system 321 and the user interface devices 200 via a distribution system 320. The distribution system 320 can be provided in any conventional manner and is configured to support any conventional type of communications, including wired communications and/or wireless communications.

Figure 12:
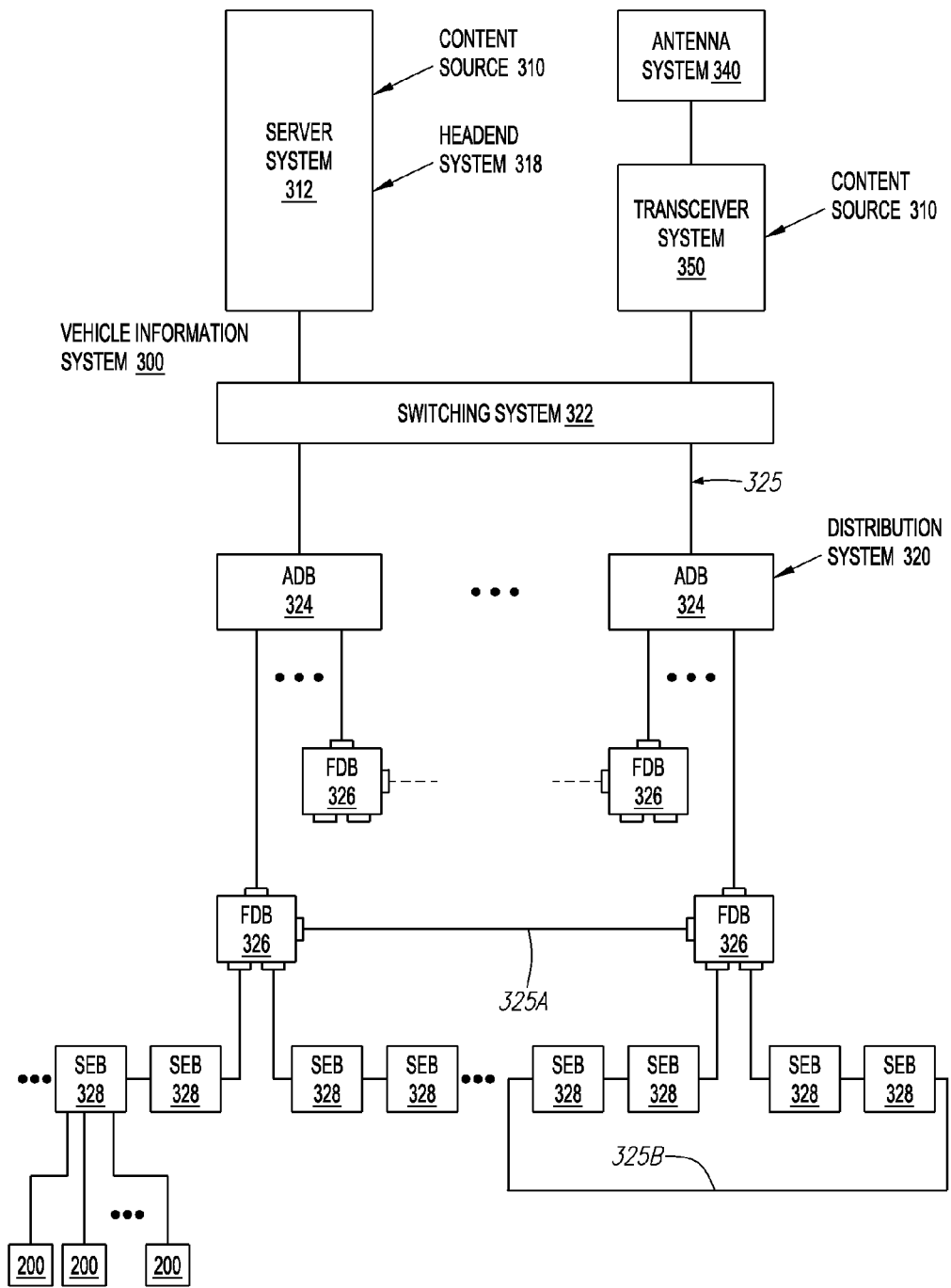
FIG. 12 is an exemplary detail drawing illustrating one preferred embodiment of a distribution system for the vehicle information systems of FIGS. 11A-B.

FIG. 12 illustrates an exemplary vehicle information system 300. The vehicle information system 300 is shown in FIG. 12 as including a headend system 318 and a plurality of passenger interface systems 200 that are configured to communicate via a distribution system 320. The headend system 318 can have at least one content source 310, such as a media server system 312 and/or an antenna system 340 and a transceiver system 350 each being provided in the manner set forth in more detail above. The distribution system 320 as shown in FIG. 12 is provided in the manner set forth in the above-referenced co-pending U.S. patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006, and in the above-referenced U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties.

The distribution system 320 thereby can be provided as a plurality of area distribution boxes (ADBs) 324, a plurality of floor disconnect boxes (FDBs) 326, and a plurality of seat electronics boxes (SEBs) (and/or premium seat electronics boxes (PSEBs)) 328 being configured to communicate via a plurality of wired and/or wireless communication connections 325. Alternatively, and/or additionally, the distribution system 320 can be provided in the manner set forth in the co-pending U.S. patent application "OPTICAL COMMUNICATION SYSTEM AND METHOD FOR DISTRIBUTING CONTENT ABOARD A MOBILE PLATFORM DURING TRAVEL," Ser. No. 12/367,406, filed Feb. 6, 2009, which is assigned to the assignee of the present application and the disclosure of which is hereby incorporated herein by reference in its entirety.

As illustrated in FIG. 12, the distribution system 320 can include a switching system 322 for providing an interface between the distribution system 320 and the headend system 318. The switching system 322 can comprise a conventional switching system, such as an Ethernet switching system, and is configured to couple the headend system 318 with the area distribution boxes 324. Preferably, the switching system 322 is coupled with each of the area distribution boxes 324 via a communication connection 325.

As desired, the switching system 322 can be provided as a plurality of interconnected switching sub-systems (not shown). if the switching system 322 is provided as a plurality of interconnected switching sub-systems, each of the switching sub-systems likewise can be configured to communicate with each of the area distribution boxes 324 via a communication connection 325. Each of the area distribution boxes 324, in turn, is coupled with a plurality of floor disconnect boxes 326 via a plurality of communication connections 325. Although the area distribution boxes 324 and the associated floor disconnect boxes 326 can be coupled in any conventional configuration, the associated floor disconnect boxes 326 preferably are disposed in a star network topology about a central area distribution box 324 as illustrated in FIG. 12.

Each floor disconnect box 326 is coupled with, and services, a plurality of daisy-chains of seat electronics boxes 328. Although it will be noted that the number and specific configuration of the seat electronics boxes 328 may be varied from system to system, the floor disconnect box 326 are shown and described with reference to FIG. 12 as being coupled with, and servicing, two daisy-chains of seat electronics boxes 328 for purposes of illustration. Each of the daisy-chains of seat electronics boxes 328 likewise can include any suitable number of seat electronics boxes 328 and is illustrated in FIG. 12 as including two daisy-chained seat electronics boxes 328. The seat electronics boxes 328, in turn, are configured to communicate with the plurality of passenger interface systems 200.

The floor disconnect boxes 326 advantageously can be provided as routing systems and/or interconnected in the manner set forth in the above-referenced co-pending U.S. patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006. As desired, the distribution system 320 can include at least one FDB internal port bypass connection 325A and/or at least one SEB loopback connection 325B. Each FDB internal port bypass connection 325A is a communication connection 325 that permits floor disconnect boxes 326 associated with different area distribution boxes 324 to directly communicate. Each SEB loopback connection 325B is a communication connection 325 that directly couples the last seat electronics box 328 in each daisy-chain of seat electronics boxes 328 for a selected floor disconnect box 326 as shown in FIG. 12. Each SEB loopback connection 325B therefore forms a loopback path among the daisy-chained seat electronics boxes 328 coupled with the relevant floor disconnect box 326.

Figure 13A:
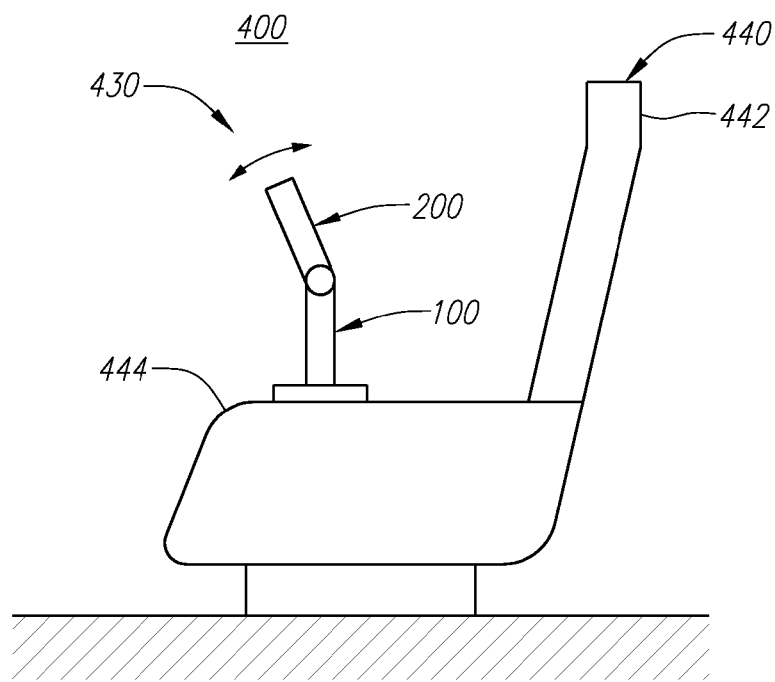
FIG. 13A is an exemplary top-level drawing illustrating a passenger compartment of a vehicle, wherein the vehicle information system of FIGS. 11A-B has been installed.
Figure 13B:
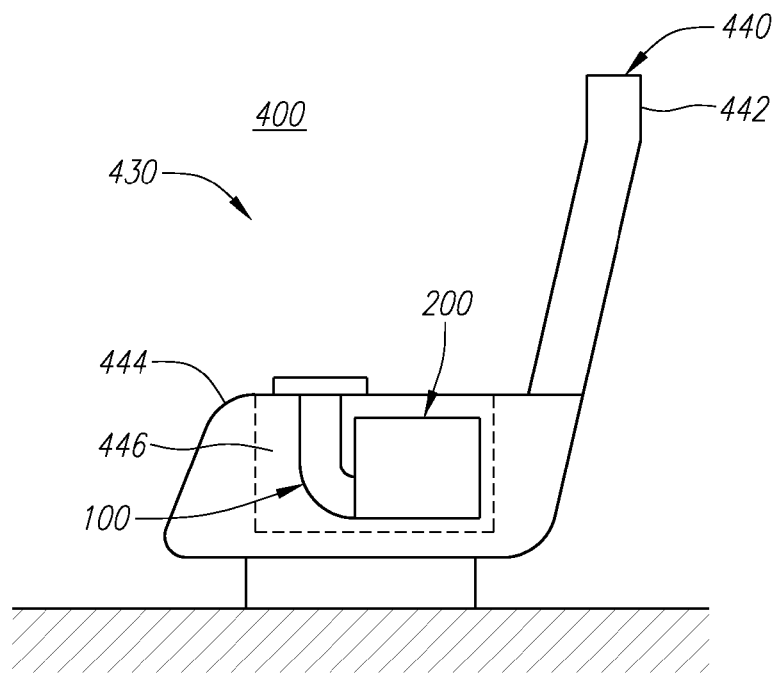
FIG. 13B is an exemplary top-level drawing illustrating an embodiment of the vehicle information system of FIG. 11A, wherein the vehicle information system is in communication with the user interface devices of FIG. 3.

FIGS. 13A-B provide a view of a passenger compartment 430 of a passenger vehicle 400, such as the automobile 410 (shown in FIG. 11A) and/or the aircraft 420 (shown in FIG. 11B), aboard which a vehicle information system 300 has been installed. The passenger compartment 430 is illustrated as including a plurality of passenger seats 440, and the passenger seats 440 are associated with user (or passenger) interface devices 200. The user interface devices 200 are mounted within the passenger compartment 430 via deployment systems 100 and can be configured to present selected viewing content provided via the vehicle information system 300 in the manner discussed in more detail above.

The deployment systems 100 can be provided in the manner set forth above with reference to FIG. 3 and are illustrated in FIG. 13A as being disposed in the deployed position. Although preferably installed at an armrest 444 of a selected passenger seat 440 as shown in FIGS. 13A-B, the deployment system 100 can be installed, for example, at any location within the passenger compartment 430, such as a wall, ceiling, and/or bulkhead, and/or at the passenger seat 440. When installed at the seat armrest 444, the user interface device 200 is mounted on the deployment system 100 and thereby coupled with the seat armrest 444. The deployment system 100 extends from the seat armrest into the deployed position and allows a position of the user interface device 200 to be adjusted relative to the passenger seat 440. As desired, a viewing angle of the user interface device 200 can readily be changed to enhance enjoyment of the presented viewing content. FIG. 13B shows the user interface device 200 in a stowed position. As illustrated in FIG. 13B, the passenger seat 440 can include an internal compartment 446 for stowing the user interface device 200 when not in use.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A deployment system, comprising:
   a device mounting assembly for receiving a selected user interface device;
   a main rotating joint system coupling said device mounting assembly with an installation location and having a progressive clutch system that includes:
      a plurality of first clutch system members each having a first contact surface; and
      a plurality of second clutch system members each having a second contact surface and being rotatable relative to a respective first clutch system member about a common axis, an engagement between respective pairs of said first contact surfaces and said second contact surfaces progressively increasing as said first clutch system members rotate relative to said second clutch system members in a first rotational direction from a stowed position toward a fully-deployed position; and
   a communication cable assembly with a communication cable having a predetermined dimension and being terminated by a system communication connector for communicating with a selected content system and a device communication connector, said device communication connector being disposed at said device mounting assembly and enabling the user interface device received by said device mounting assembly to communicate with the selected content system via said communication cable assembly,
   wherein said main rotating joint system forms an internal channel with a preselected dimension that is greater than the predetermined dimension of said communication cable and that enables said communication cable to float within said main rotating joint system such that any twisting of said communication cable due to transitions between the stowed position and the fully-deployed position can be distributed along a length of said communication cable, and
   wherein a first high contact surface extends at a first predetermined distance from a selected first contact surface, said first high contact surface for engaging a second high contact surface extending at a second predetermined distance from a selected second contact surface.

2. The deployment system of claim 1,
   wherein at least one of said first clutch system members is selected from a first group consisting of an auxiliary main clutch disk system and a main clutch shaft system, and
   wherein at least one of said second clutch system members is selected from a second group consisting of a main clutch pivot house system and a main clutch insert system.

3. The deployment system of claim 1, wherein said first and second clutch system members rotate with a minimum engagement level between said first and second contact surfaces when said first clutch system members are adjacent to the stowed position and reaches a maximum engagement level between said first and second contact surfaces when said first clutch system members reach the fully-deployed position.

4. The deployment system of claim 1, wherein the engagement between said first and second contact surfaces progressively decreases as said first clutch system members rotate relative to said second clutch system members in a second rotational direction from the fully-deployed position toward the stowed position.

5. The deployment system of claim 1, wherein said first and second high contact surfaces are provided as one of a ramp and at least one step.

6. The deployment system of claim 1,
wherein said first high contact surface comprises a preselected ten-percent range between ten percent and ninety percent of said selected first contact surface and extends from said selected first contact surface within a preselected two-mil range between one-half mil and ten mils; and
wherein said second high contact surface comprises a preselected ten-percent range between ten percent and ninety percent of said selected second contact surface and extends from said selected second contact surface within a preselected two-mil range between one-half mil and ten mils.

7. The deployment system of claim 1, further comprising an extension support system for coupling said device mounting assembly with said main rotating joint system, said extension support system forming an internal channel with a preselected dimension that is greater than the predetermined dimension of said communication cable, the internal channel of said extension support system communicating with the internal channel of said main rotating joint system and enabling said communication cable to float within said extension support system such that any twisting of said communication cable due to transitions between the stowed position and the fully-deployed position can be distributed along a length of said communication cable.

8. The deployment system of claim 7, further comprising an interface system for providing at least one of a peripheral connection port, an audio connection port, a Universal Serial Bus (USB) port, a control switch, a video control switch, and an audio control switch, said interface system being disposed upon at least one of said main rotating joint system, said device mounting assembly, and said extension support system.

9. The deployment system of claim 7, wherein at least one of said main rotating joint system, said device mounting assembly, and said extension support system is provided with a customized decorative finish, the customized decorative finish being selected from a group consisting of an anodized finish, a painted finish, a decorative film coating, a snap-on cover, and a leather finish.

10. The deployment system of claim 1,
wherein the user interface device includes at least one advanced function such that the user interface device has a weight that is greater than a weight of a conventional video display system, and
wherein said communication cable has a cable cross-section between five hundred mils and six hundred and fifty mils that is greater than a cross-section of a conventional video communication cable.

11. The deployment system of claim 1, wherein said main rotating joint system further comprises a retarding system for helping to prevent drop injuries and damage to the user interface device.

12. The deployment system of claim 1, wherein said first clutch system members are held stationary as said second clutch system members rotate about said first clutch system members.

13. The deployment system of claim 1, wherein at least one of said first and second clutch system members is formed from an acetal resin, nylon, or other thermoplastic material.

14. A user seat, comprising:
a seatback;
an armrest; and
a deployment system for transitioning a selected user interface device between a stowed position and a fully-deployed position, said deployment system being disposed adjacent to one of said seatback and said armrest and being provided in accordance with claim 1,
wherein the user seat includes an internal compartment for stowing the user interface device in the stowed position.

15. An entertainment system suitable for installation aboard a passenger vehicle, comprising:
a selected content system;
a plurality of user interface device for communicating with said content system; and
a plurality of passenger seats each including a deployment system for transitioning a selected user interface device between a stowed position and a fully-deployed position, said deployment system being disposed adjacent to one of a seatback and an armrest of the relevant passenger seat and being provided in accordance with claim 1,
wherein the passenger vehicle is selected from a group consisting of an automobile, an aircraft, a bus, a recreational vehicle, a boat, and a locomotive.

16. An aircraft, comprising:
a fuselage;
a plurality of passenger seats arranged within said fuselage; and
an entertainment system coupled with said fuselage and being provided in accordance with claim 15.

17. A method for providing a deployment system, comprising:
providing a main rotating joint system forming an internal channel with a preselected dimension and having a progressive clutch system that includes:
a plurality of first clutch system members each having a first contact surface; and
a plurality of second clutch system members each having a second contact surface and being rotatable relative to a respective first clutch system member about a common axis, an engagement between respective pairs of said first contact surfaces and said second contact surfaces progressively increasing as said first clutch system members rotate relative to said second clutch system members in a first rotational direction from a stowed position toward a fully-deployed position;
coupling a device mounting assembly with said main rotating joint system;
providing a communication cable assembly with a communication cable having a predetermined dimension and being terminated by a system communication connector for communicating with a selected content system and a device communication connector, the predetermined dimension of said communication cable being less than the preselected dimension of the internal channel;

disposing said communication cable assembly within the internal channel such that said device communication connector is disposed at said device mounting assembly and enables a selected user interface device received by said device mounting assembly to communicate with the selected content system via said communication cable assembly; and coupling said device mounting assembly with an installation location, wherein said main rotating joint system enables said communication cable to float within said main rotating joint system such that any twisting of said communication cable due to transitions between the stowed position and the fully-deployed position can be distributed along a length of said communication cable, and wherein a first high contact surface extends at a first predetermined distance from a selected first contact surface, said first high contact surface for engaging a second high contact surface extending at a second predetermined distance from a selected second contact surface.

18. A deployment system, comprising:

a device mounting assembly for receiving a selected user interface device; and a main rotating joint system coupling said device mounting assembly with an installation location and including a progressive clutch system, said progressive clutch system comprising:

an auxiliary main clutch disk system having a first contact surface; and a main clutch pivot house system being rotatable relative to said auxiliary main clutch disk system about a common axis and having a second contact surface, wherein said first contact surface progressively engages said second contact surface as said auxiliary main clutch disk system rotates relative to said main clutch pivot house system, and wherein a first high contact surface extends at a first predetermined distance from a selected first contact surface, said first high contact surface for engaging a second high contact surface extending at a second predetermined distance from a selected second contact surface.

19. A method for assembling a progressive clutch system for the deployment system of claim 18, comprising:

disposing a main clutch pivot house system having a second contact surface adjacent to an auxiliary main clutch disk system having a first contact surface; and enabling said first contact surface to progressively engage said second contact surface as said auxiliary main clutch disk system rotates relative to said main clutch pivot house system about a common axis.

\* \* \* \* \*